United States Patent [19]

Starkey et al.

[11] Patent Number: 5,001,339
[45] Date of Patent: Mar. 19, 1991

[54] OPTO-ELECTRONIC SENSING METHOD AND DEVICE FOR AN ACOUSTIC PIANO

[75] Inventors: David T. Starkey; Anthony G. Williams, both of San Diego, Calif.

[73] Assignee: Gulbransen, Inc., San Diego, Calif.

[21] Appl. No.: 329,008

[22] Filed: Mar. 27, 1989

[51] Int. Cl.⁵ .............................................. G01D 5/34
[52] U.S. Cl. ..................................... 250/229; 200/332
[58] Field of Search .................. 250/221, 229, 211 K; 341/31; 340/709; 200/332

[56] References Cited

U.S. PATENT DOCUMENTS

| | | | |
|---|---|---|---|
| 4,680,465 | 7/1987 | Stevens | 250/229 |
| 4,731,530 | 3/1988 | Mikan | 250/221 |
| 4,864,124 | 9/1989 | Mirabella et al. | 200/332 |
| 4,894,530 | 1/1990 | Kitchen | 250/229 |

*Primary Examiner*—David C. Nelms

[57] ABSTRACT

A new, inexpensive and unobtrusive opto-electronic sensor which requires no manual adjustments after installation under the keys of the piano keyboard. Post-installation manual adjustments are unnecessary because a method embodied in a computer program and performed by a microprocessor digitally adjusts the operating ranges of the keys. After electronic adjustment, the opto-electronic sensors are scanned and sampled according to another portion of the method to determine the current key position and velocity. The key position and the velocity determined by the method are then transmitted in a MIDI compatible data stream.

13 Claims, 22 Drawing Sheets

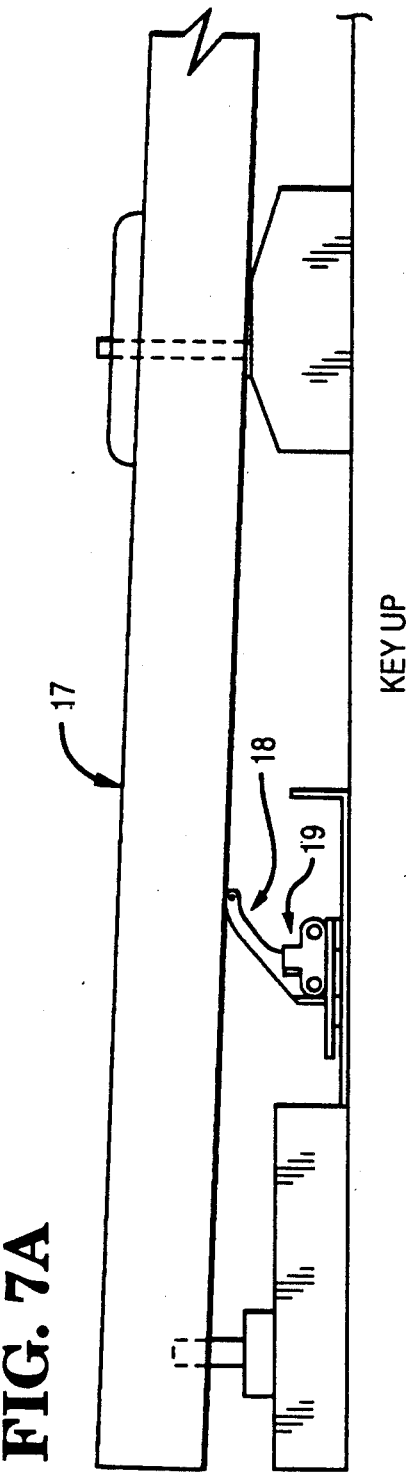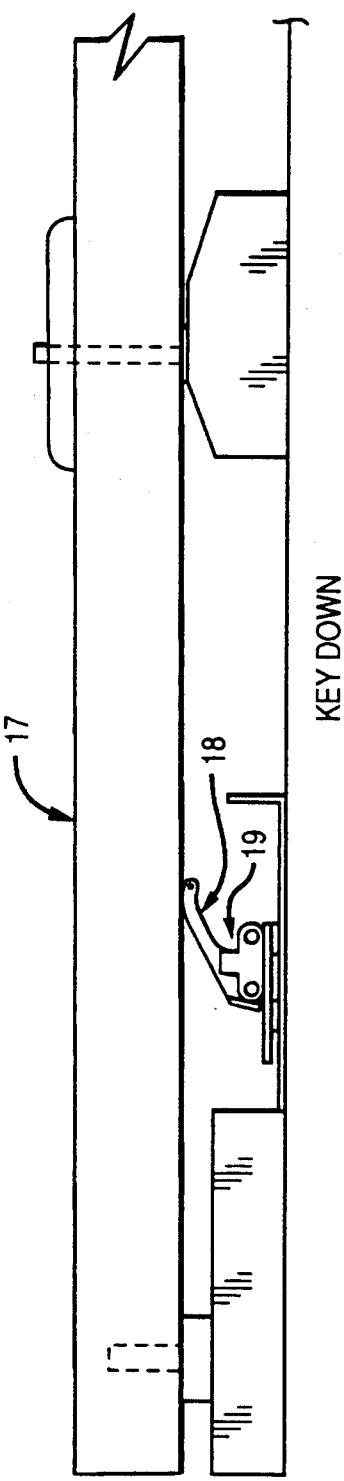

*UART = UNIVERSAL ASYNCHRONOUS RECEIVER TRANSMITTER

OPTO-ELECTRONIC SENSING METHOD AND DEVICE FOR AN ACOUSTIC PIANO

BACKGROUND OF THE INVENTION

This invention relates to a simple, low cost apparatus that can be easily installed underneath the keyboard of an acoustic piano for sensing musical note selection and note expression data, and a procedure for capturing the musical note selection and the note expression data.

There are many known ways of detecting a displacement and a displacement speed, or other note expression data of a keyboard for a musical instrument. The earliest known methods were mechanical switch structures. However, these had significant disadvantages, such as uniformity of response and unpredictable aftertouch control. Additionally, these types of switches affected key touch while playing, required time-consuming mounting, needed very tight vertical and horizontal adjustment, and generally had a high cost. For a further discussion of the problems of electro-mechanical switches see U.S. Pat. No. 4,628,786 issued to Buchla.

The apparatus, according to Buchla, overcomes some of the problems and disadvantages of these prior art mechanical switch structures by providing a pickup for each key that is moved within an electric field formed between a pair of stationary electrodes. Although still a mechanical system, since the pickup never contacts either of the electrodes, Buchla avoids many of the problems inherent in previous mechanical contact switches. A major advantage of the Buchla apparatus is that the voltage impressed on the pickup varies as a function of the position of the pickup within the electric field (i.e. voltage varies according to amount of key depression). The Buchla invention is thus a continuous linear position sensor providing the capability to capture greater note expression data, and provide for better velocity resolution. However, this apparatus is complex, costly, and requires time consuming installation and calibration. Additionally, the circuitry required to impress the AC voltages of equal amplitude but opposite phase on the two electrodes and the detection circuitry are again complex and costly.

In response to the above inherent limitations of mechanical switch structures, inventions utilizing various types of opto-electronic switches have been provided. One of the first was U.S. Pat. No. 4,351,221 issued to Starnes, et al. This system however requires two optical LED sensors per key and utilizes the sensors in a manner that creates a double contact system, thus eliminating the advantages of continuous linear position sensor. Additionally, this apparatus requires elaborate and delicate installation of photosensors. It is also expensive and requires the services of a skilled piano tuner or electronics technician.

Another opto-electronic switch mechanism is known from U.S. Pat. No. 4,362,934 issued to McLey. However, this apparatus has the same limitations as the system issued to Starnes, et al discussed above and further, is more commonly limited to electronic keyboards.

Another optical sensing means is known from U.S. Pat. No. 4,736,662 issued to Yamamoto. In order to reduce the number of displacement speed electrical signal converting elements and provide a design for use in a limited space, this apparatus utilizes optical sensor elements in conjunction with optical fibers. However, as described in the patent, the apparatus is complex and very costly. Additionally, the system would require delicate installation by a trained technician and fine calibration since the shutter system requires tight horizontal and vertical adjustments because the shutter affects the keying point of the key. Finally, it still operates as a two contact or two-step switch with the inherent disadvantages thereof compared to a continuous linear system.

Another recent invention is known from U.S. Pat. No. 4,768,412 issued to Sanderson. This system uses a single optical sensor per key and is designed for recording and scoring music and is by design portable and primarily applicable as a temporary add-on unit. It sits on top of the keyboard and is thus visibly obtrusive. Further, the patent itself indicates that it "... minimally interferes with the musician's movements as he plays ...". Additionally, the embodiment of the invention requires a piston and wiper assembly pair to be connected by adjustable connecting means to accommodate various key heights on different keyboards. Not only is this known plunger system with pistons, wipers and springs/channels complicated and costly, it is compounded given the fact that they are working in a linear range the length of the aperture of the photo-sensor. This requires very tight vertical resolution capability and adjustment problems. This invention also utilizes detection circuitry which compares the incoming analog voltage from the movement of the key with previously calibrated high and low voltage levels for purposes of determining key stroke velocity. However, this assumes that all keys have the same voltage differential for an equivalent vertical movement. Variations in key thickness and gain differentials in optical sensors will cause velocity resolutions to be very poor. This system also does not have the capability to provide actuation of the foot pedals of the piano to produce pedal signals.

SUMMARY OF THE INVENTION

It is, therefore, a principal object of the present invention to provide for a displacement or displacement speed sensing device for a movable element in an acoustic piano, wherein the sensing device can be incorporated in a limited space.

It is another object of the present invention to provide a displacement or displacement speed sensing device for a movable element in an acoustic piano which is both visibly hidden and mechanically, completely unobtrusive to the musician.

It is yet another object of the present invention to provide a displacement or displacement speed sensing device for a movable element in an acoustic piano which provides for continuous linear sensing. That is, the voltage detected as the movable element is depressed will vary as a function of the position of the movable element.

It is yet another object of the present invention to provide a displacement or displacement speed sensing device for a movable element in an acoustic piano which is very inexpensive, incorporates only one opto-electronic sensor per movable element, incorporates very few other components, and is easily expandable when manufactured to cover any number of keys.

It is yet another object of the present invention to provide for a displacement or displacement speed sensing device that is inherently reliable, and which does not require a piano tuner, electronics technician, or other expertise to install.

It is yet another object of the present invention to provide for a displacement or displacement speed sensing device with a design that can accommodate almost any piano, and which virtually eliminates vertical and horizontal calibration or adjustment.

Another object of the present invention is to provide a displacement or displacement speed sensing device with simplified electronics and software implementation that allows for complete adjustability and flexibility regarding the capture of musical note and note expression data. This allows for the ability to generate the full range of musical effects and to dynamically change the independently generated trigger thresholds to do all kinds of things (i.e. set re-attack/re-trigger points, and release an event anywhere within the full travel of the key, all without affecting the key action).

Another object of the present invention is to provide the ability, through a simple cabling means attached to the displacement or displacement speed sensing device, to provide actuation of the foot pedals of the piano to produce pedal signals.

Another object of the present invention is to convert analog musical information into digital data compatible with the industry standard Music Instrument Digital Interface (MIDI).

A further object of the present invention is to provide a displacement or displacement speed sensing device for a movable element in an acoustic piano which not only is a continuous linear position sensor, but which also lengthens the vertical travel over which there is a linear range of output.

Other objects and further scope of applicability of the present invention will become apparent from the detailed description to follow, and the drawings.

In order to achieve the above objects, the present invention relates to a displacement or displacement speed sensing device for a movable element in an acoustic piano which uses a novel flag or actuator design, and a software system that provides for an adjustment process that allows for dynamically generated thresholds.

Musical data comprising key and key expression information is captured with the use of opto-electronic sensors. There is one opto-electronic sensor corresponding to each key and foot pedal of the keyboard. The present invention utilizes standard opto-electronic sensors with a known aperture between the phototransistor and the light emitting diode (LED), where the transistor current is proportional to the light source. The critical design issue was a matter of constructing an applicable actuator device or flag that would pivot on a shaft (i.e. the shaft goes through the "ears" of the opto-electronic sensor) and that would go through, or cut across, the aperture of the opto-electronic sensor in a manner that would measure continuously the position of the piano key or movable element, create a linear transducer, and enable the ability to lengthen the vertical travel over which there is a linear range of output. The other critical design feature of the actuator or flag is that it accomplishes the above objectives but in a compact form so as to be able to be incorporated in a limited or small space, and in a manner that virtually eliminates vertical and horizontal adjustments.

When a key or movable element is at rest, or in an "up" position, light emanating from the LED of the opto-electronic sensor impinges on a phototransistor. The phototransistor responds to the amount and intensity of the light by generating a proportional analog collector current. When, however, a key or movable element is struck or depressed, the actuator or flag, which is pivoted on a shaft, cuts across the aperture of the opto-electronic sensor, linearly blocking the light impinging on the phototransistor, and resulting in a decrease in this collector current. Thus, the key or movable element position and key stroke or movable element velocity information is captured by the opto-electronic sensor. The manner in which velocity and musical note effects are determined will be discussed in detail in the description of the preferred embodiment.

The analog voltage data from the opto-electronic sensing device is then analyzed preferably in a processing unit. The processing unit comprises a clocking means generating clock pulses that are transmitted to the device of the invention sequentially. Thus, only one opto-electronic sensing device is enabled at any point in time at the clock rate. The resultant analog voltage signal generated by the phototransistor of the opto-electronic sensing device is then fed through a sample and hold circuit and then forwarded to the input of an analog to digital convertor, which then begins its conversion process. The processing unit further preferably comprises a microprocessor and a universal asynchronous receiver transmitter chip (UART). When the conversion process in the analog to digital convertor is complete, the microprocessor then reads the encoded key information in digital format, analyzes and converts the data to a form that is in accordance with a computer-compatible bus and protocol specification, such as the MIDI specification, and transmits the data through the UART to a musical instrument or computer for further editing and processing as required.

The microprocessor handles data processing utilizing a unique software implementation that allows for complete adjustability and flexibility regarding the capture of musical note and note expression data. At installation the software first executes an adjustment procedure. The objective of the adjustment procedure is to establish an independent rest and down position for each key or movable element. These values are then stored in non-volatile storage. The first procedure performed during normal use is the initialization procedure. The objective of the initialization procedure is to read the rest__position and down__position for each key from non-volatile storage, then calculate the total travel, establish a first threshold level (threshold1), a second threshold level (threshold2) and a re-trigger threshold (retrigger__threshold) for each key. Thus, the full travel of the key is broken into three main regions or zones (see FIG. 11). Region 1 is the area between the rest__position and threshold1; region 2 is the area between threshold1 and threshold2, and region 3 is the area between threshold2 and the down__position. Region 2 is further delineated between region 2A and region 2B by the retrigger__threshold. These independently generated thresholds for each key allows the system to dynamically set re-attack/re-trigger points and allows for the ability to output an event anywhere within the full travel of the key, all without affecting the key action. Thus, the full range of musical effects, such as trills, staccato, legato, pianissimo, or fortissimo can be easily captured.

Another important advantage of this software implementation is that the resolution of the velocity measurement is independent of the scanning rate and is constant at all velocities. In prior art systems, key velocity is determined by the number of scans between key initiation and full key closure (between two specific non-changeable contact points, whether mechanical or optical). Even if a high resolution system timer is used to record the time of switch closures, the accuracy of the measurement is equal to the number of scans during flight. Particularly at high velocities, the resolution is inadequate for current state-of-the-art scanning systems. In the current invention, key velocity is calculated by the amount of time that it takes to go between two ADC values. Although these ADC values have proximity to set thresholds, their actual values will vary depending on the scanning rate. The software implementation, therefore, forces velocity resolution to be a function of the number of ADC values between these two thresholds and the resolution of the system timer; scanning rate is removed from the calculation. The velocity resolution is the lesser of the distance resolution and the timing resolution. Thus, small changes in the hardware can be made (i.e. use a 12-bit ADC instead of an 8-bit ADC and use a 2 KHz system timer instead of a 1 KHz timer) instead of having to use a more expensive microprocessor to improve the velocity resolution. Further, the keys or movable elements sensing the keys can be scanned at a lower rate than prior art systems and still maintain the requisite velocity resolution. Thus, the method for sensing the key states does not have to scan at any one particular rate. Also, the way the method of the software is executed, it does not matter if the key state scan is performed at a regular rate or not. The method stores and uses time and ADC values in absolute values. The primary limitation on the slowness of the scan rate is the fact that a musician can begin to detect an event output delay as the scan rate approaches 4 to 6 milliseconds.

In a similar manner, threshold1 is used to send out a release event and to measure a release velocity.

Another advantage of the present system is in the re-keying of a note. If an attack event had already occurred, and rapid re-keying was initiated, in a double contact system it would be necessary to get the key to raise to a point where it would rise above the uppermost contact before a velocity on the downward stroke could be read. With the software implementation of this invention, each key position can be continuously determined. So, the key rise and when the key starts to head back down again under a re-keying scenario, the time and distance from the point that the key crossed the keying threshold again to the previous highpoint that the key had reached can easily be measured in order to determine the velocity and send out a re-attack event. This method allows the very accurate capture of the full range of musical effects and mimicing the re-keying characteristics of an acoustic piano. When the time between two specific non-changeable contact points or thresholds is measured, by definition the keys or movable elements must go through those thresholds. However, the continuous convertor scan system of the present invention is not so limited. In the system of the present invention, the keys or movable elements can change directions and do anything in real time as they are being played, as long as the scan rate is fast enough to detect the changes.

So basically, the software implementation of our invention provides considerable flexibility. The thresholds can be adjusted, the positions of the thresholds can be empirically determined and adjusted, the retrigger threshold can be adjusted, and the software compensates for any delays or overloads. Since the actual ADC values between thresholds are used in velocity measurement, the fact that the current scan rate is six milliseconds does not matter. In other words, the software implementation allows the system to slow down gracefully. This slow down, when it occurs, is unnoticeable until the scan rate reaches the 4-6 millisecond range.

BRIEF DESCRIPTION OF THE DRAWINGS

FIGS. 7A and 7B are side views of a single opto-electronic sensing device of the invention showing its placement underneath a standard piano key. FIG. 7A illustrates the opto-electronic sensing device of the invention when the piano key is in a fully-up or "rest" position, with FIG. 7B.

Appendix A is a software description of the five different aspects or procedures of the system software for the preferred embodiment of the invention.

DESCRIPTION OF THE PREFERRED EMBODIMENT

This invention relates to a displacement or displacement speed sensing device for a movable element in an acoustic piano which is used to capture note and note expression data. The invention further relates to a method or software system that permits complete flexibility, allowing for the ability to mimic or generate the full range of musical effects and to dynamically change the independently generated trigger thresholds to perform numerous keyboard initiated events, i.e. adjust re-attack/re-trigger points, release an event anywhere within the full travel of the key, provide more accurate velocity measurement resolution, all without affecting the normal key action. A microprocessor based detection and conversion system utilizes the data conversion algorithms and program instructions to analyze, convert, and transmit the data in a format suitable for computer communications.

With reference now to FIGS. 1A-1E, various perspectives of the novel flag or actuator design are shown. The critical design feature was a matter of constructing the flag or actuator so that it would pivot on a shaft and cut across the aperture of the opto-electronic sensor in association with depression of a key or movable element in a manner that would continuously sense the position of the movable element or key, create a linear transducer, and generate the ability to lengthen the vertical travel over which there is a linear range of output. Additionally, the opto-electronic sensing device incorporating the flag needed to accomplish the above design objectives in a compact form, and in a manner that would virtually eliminate mechanical adjustments.

Figure 1A:
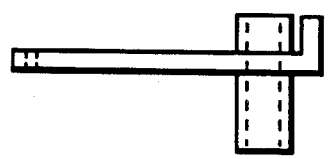
FIG. 1A shows a plan view of a flag and actuator design.
Figure 1B:
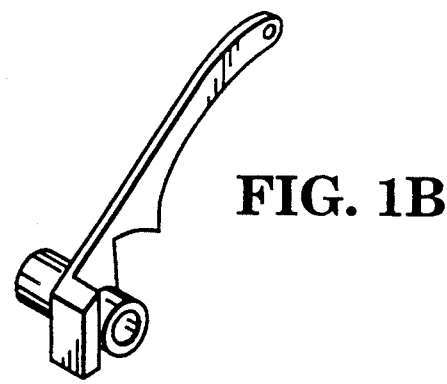
FIG. 1B shows a perspective view of the flag and actuator design shown in FIG. 1A.
Figure 1E:
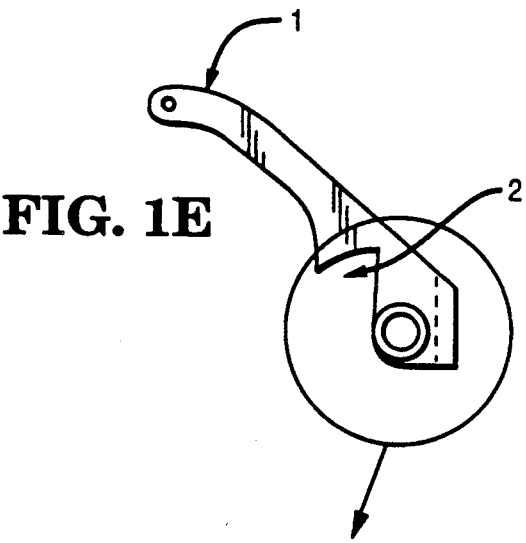
FIGS. 1D and 1E are side elevational views of the flag and actuator design shown in FIG. 1A with FIG. 1D being enlarged and partially broken away to emphasize details of the flag.
Figure 1C:
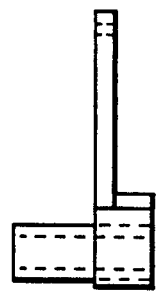
FIG. 1C shows a front elevational view of the flag and actuator design shown in FIG. 1A.
Figure 1D:
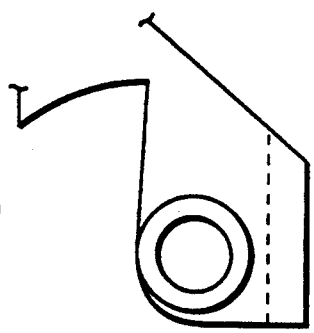
Figure 2A:
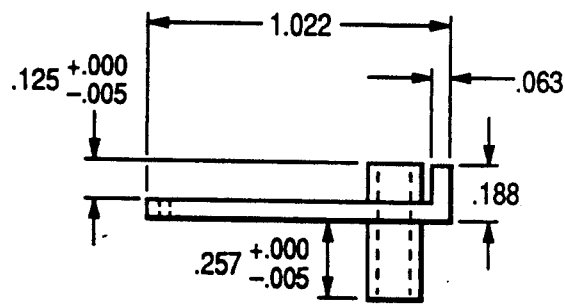
FIG. 2A shows a plan view with dimensions of a specific embodiment of a flag and actuator.
Figure 2B:
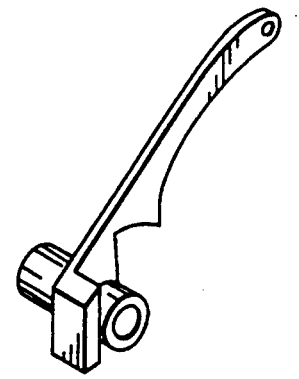
FIG. 2B shows a perspective view of the flag and actuator shown in FIG. 2A.
Figure 2E:
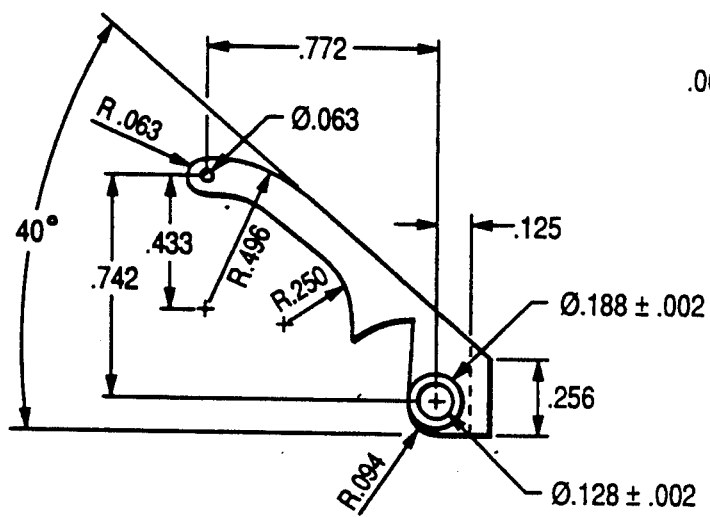
FIGS. 2D and 2E are side elevational views with dimensions of the flag and actuator shown in FIG. 2A with FIG. 2D being enlarged and partially broken away to emphasize details of the flag.
Figure 2C:
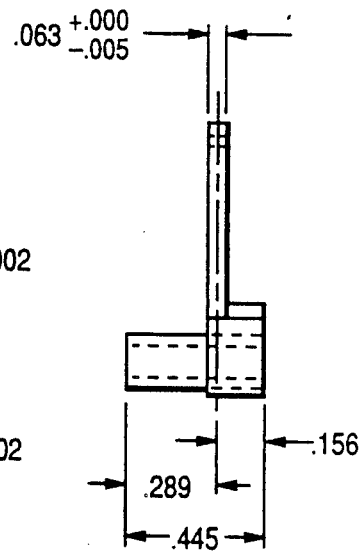
FIG. 2C shows a front elevational view with dimensions of the flag and actuator shown in FIG. 2A.
Figure 2D:
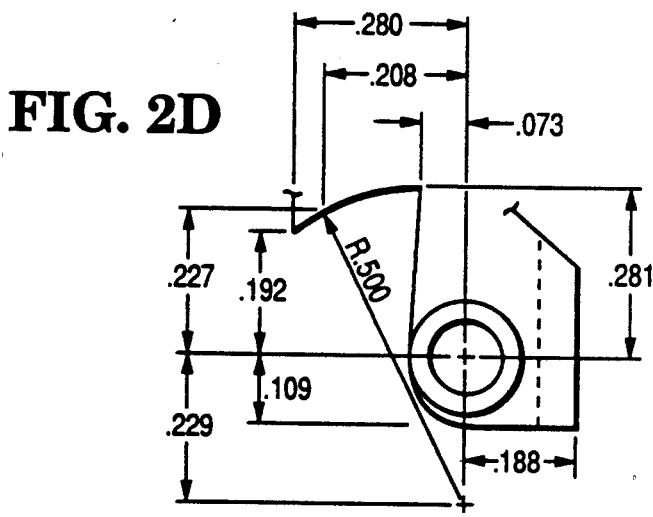

In the design of the actuator or flag, there were two important curves or angular shapes that needed to be defined and considered. Referring to FIG. 1A, first the shape or curvature 1 of the actuator, which is the tangential point of contact with the underside or bottom of the piano key, had to be such that as the piano key was depressed, the tangential points of contact between the flag and underside of the key would remain constant or be minimized. This was necessary to eliminate, or minimize, the amount of roll or scoot along beneath the piano key, and thus the amount of wear on both the actuator portion of the flag and the key. Additionally, a very constant tangential point of contact as the key is depressed facilitates a linear vertical displacement of the flag. Secondly, the curvature and angular shape 2 of the area adjacent to the pivot point determines the angular displacement vs. the percentage of light transmission curve. When a piano key or movable element is depressed, there is an angular displacement of the actuator or flag, and it is this area that displaces across the aperture. This shielding determines the amount of light emanating from the LED of the opto-electronic sensor that is going to impinge on the phototransistor. The specific design or shape of this area determines the extent to which the range of the aperture is optimized or lengthened for continuous linear operation over a desired angular deflection. It will be obvious that within the above general design objectives the flag or actuator may be of more complex or of different design. It will also be seen, in the discussion of one specific embodiment, how the above design of the flag virtually eliminates mechanical adjustments.

Referring now to FIGS. 2A-2E, one very specific embodiment has the dimensions indicated. In the design of this specific embodiment, first of all the average vertical travel of a piano key, at the tip, was determined to be approximately 10 mm and that the typical vertical movement back from the tip where the actuator would be located was determined to be approximately 5 mm to 6 mm. Tests of the particular opto-electronic sensor utilized in this embodiment determined that the working area of the aperture was approximately 0.5 mm wide and 2 mm long. Also, it was determined that the working region under most acoustic piano keyboards could be accommodated with a switch action that ranged between 1 1/16" in the fully up position and approximately 9/16" in the fully down position. Thus, in order to accommodate virtually all pianos, and make the design such that no dimensions were critical (i.e. enough dimensional travel and flexibility to eliminate manual adjustment resolution problems), it was decided that the design of the actuator blade should expand the linear working range of the aperture from 2 mm to approximately 12 mm, or ½" (1 1/16"-9/16"). The expanded linear region also simplifies installation (adjustment resolutions would obviously be much finer and require more complex assembly and adjustment if the working linear region were kept at the 2 mm aperture length) and allows for ⅛" shim resolutions if a piano requires a vertical height greater than the fully-up height of the switching mechanism of 1 1/16". However, given the length of the pivot point to the center of the aperture of 7.5 mm, a 6 to 1 expansion of the linear range to 12 mm geometrically would require a straight actuator blade approximately 45 mm (2") long. Since the height and length of such a switching mechanism would be more difficult to accommodate than one which was more compact, further refinements were put into the preferred embodiment. Thus, in order to design a more compact switch actuator but still maintain an approximately 12 mm linear range, the two angular shapes 1 and 2 in FIG. 1A were optimized to create a compact mechanical reducer, i.e. generate the ability to lengthen the continuous linear operation of the aperture by a ratio of approximately 6:1, but accomplish it with a compact design.

Figure 3:
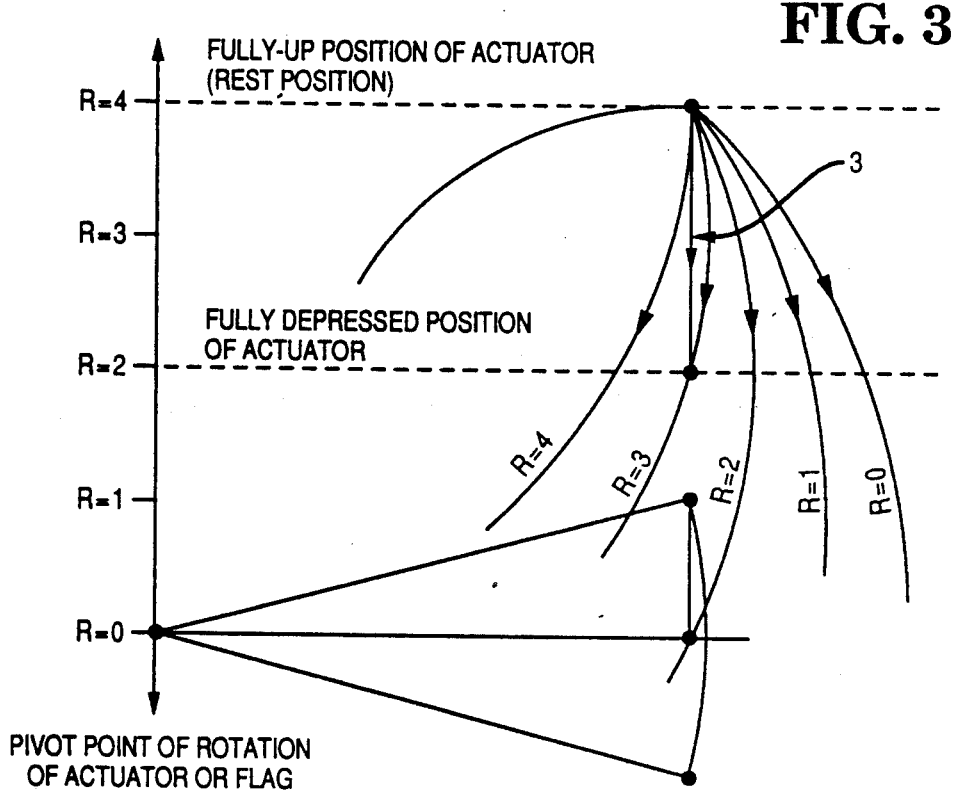
FIG. 3 demonstrates the geometric methodology of determining an optimum radius for a circular curve solution to angular shape 1 of FIG. 1.

Although there is probably a mathematical solution that would provide for a constant tangential point as the key is depressed, it would most likely be represented by a complex mathematical curve. In order to simplify the design and promote cost effective manufacture of the actuator, an optimized solution using a circular curve was selected. The optimal radius of the circular curve which minimizes travel along the longitudinal axis of the key was determined geometrically utilizing a compass (see FIG. 3). FIG. 3 is not dimensionally to scale, but is provided to show the methodology utilized in the solution. Line 3 shows the optimal locus of tangential points that would represent a constant point of contact throughout the travel of the key. Geometrically, it can be shown that no circular curve will provide for the initial point of tangency (when the key is undepressed) to remain constant as the actuator blade traces out an arc (i.e. the top of the actuator blade at the tip traces out the arc r=0 as it is depressed). However, geometrically it can be shown that there is a family of circles represented by various radii, with their centers directly below the initial point of tangency (along the locus of points represented by Line 3) such that the locus of tangency with the piano key will trace out the various arcs represented by the arcs r=0, r=1, etc. in FIG. 3 as the actuator blade is depressed. The circular curve with the radius r which minimizes the travel distance between the optimal locus of points represented by Line 3 and the arc with radius r traversed by the points of tangency is an optimal solution utilizing a circular curve.

Secondly, the angular shape 2 in FIG. 1A was optimized experimentally utilizing computer aided design (CAD) and extensive tests and measurements with the opto-electronic sensors utilized. After numerous attempts, a design finally yielded an actuator with specific dimensions (FIGS. 2A-2E) that accomplished the desired objectives, i.e. lengthen the continuous linear range of operation to the desired level of approximately 12 mm within specific constraints on the size of the actuator or flag. This specific embodiment FIGS. 2A-2E is not a trivial solution since reflectivity and premature pinch-off at the two ends of the aperture do occur to distort the opto-electronic sensor output in a non-linear fashion. It should also be noted that although a straight edged actuator or flag design should technically provide a continuous linear output, in practice, due to the distortions discussed and the fact that it would require a mechanical design with extremely fine resolution capability (due to the nature of working within a very small aperture length since linear range is not lengthened; 2 mm length for the opto-electronic sensors that is used), which is impractical.

The present invention virtually eliminates the three kinds of mechanical adjustments. First, this invention expands the linear range of operation to an extent larger than the average travel of a piano key in the region where the opto-electronic sensors are placed. Thus, the vertical resolution of the invention is very forgiving. For the specific embodiment of FIGS. 2A-2E, the opto-electronic sensing device provides for continuous linear position measurements over a range of approximately 12 mm in vertical travel. The average piano key, in the region where the sensors would be placed, would have an average travel of approximately 5 mm. This means that all that is needed is to mount the sensor underneath the key such that the 5 mm average travel for the piano key is within the 12 mm window of the opto-electronic sensing device. This is very easy. Additionally, for the specific embodiment of FIGS. 2A-2E, the fully-up and fully depressed position of the sensing device was designed to range from 1 1/16" to approximately 9/16". This covers the working region of most acoustic pianos and thus eliminates any vertical adjustments. If an acoustic piano requires a vertical height greater than the fully-up height of 1 1/16" of the switching mechanism, this can be easily accommodated using one-eighth inch shims. Finer mechanical resolution adjustments are eliminated. Further, fine vertical resolution adjustments required in prior art inventions to take care of individual key thickness variations and gain differentials between opto-electronic sensors are eliminated and completely compensated for by the operating method of the preferred embodiment (i.e. independently generated thresholds for each movable element or key normalize for the variations).

The lateral or horizontal adjustment is also easily handled because the actuator portion of the flag is very narrow relative to a piano key. As long as the actuator rides along underneath the piano key it works. It does not matter whether the flag is directly centered along the key or located toward the left or right edges. Thus, when manufacturing the opto-electronic sensing devices where a plurality of switching mechanisms comprising opto-electronic sensors connected to the actuators or flags is arranged in a single line, the narrow width of the actuators allows the ability to design manufacturing such that the actuators would tangentially be set at the centers of the piano keys for a nominal or average piano key width. Thus, if the opto-electronic sensing devices were to be used for a piano that had narrower key widths, then the switching mechanisms at the center of the keyboard would ride tangentially in the middle of the keys, and the switching mechanisms at the ends of the keyboard from the center would ride closer to the respective edges of the piano keys. Thus, the present invention obviates the need for lateral adjustments. In fact, all lateral adjustments and calibrations are eliminated, not only at installation, but also in manufacturing.

Finally, the forward and aft variation problem, i.e. whether the opto-electronic sensing devices are mounted underneath closer to the front or tip of the piano keys or closer to the pivot point towards the rear, does not matter. The expanded linear region provided by the invention in conjunction with the operating method of the preferred embodiment allows complete flexibility since the method compensates for variations of vertical travel. This also eliminates any mechanical calibrations or adjustments required in prior art systems to compensate for difference in angle of attack and vertical travel between black and white keys.

Figure 4:
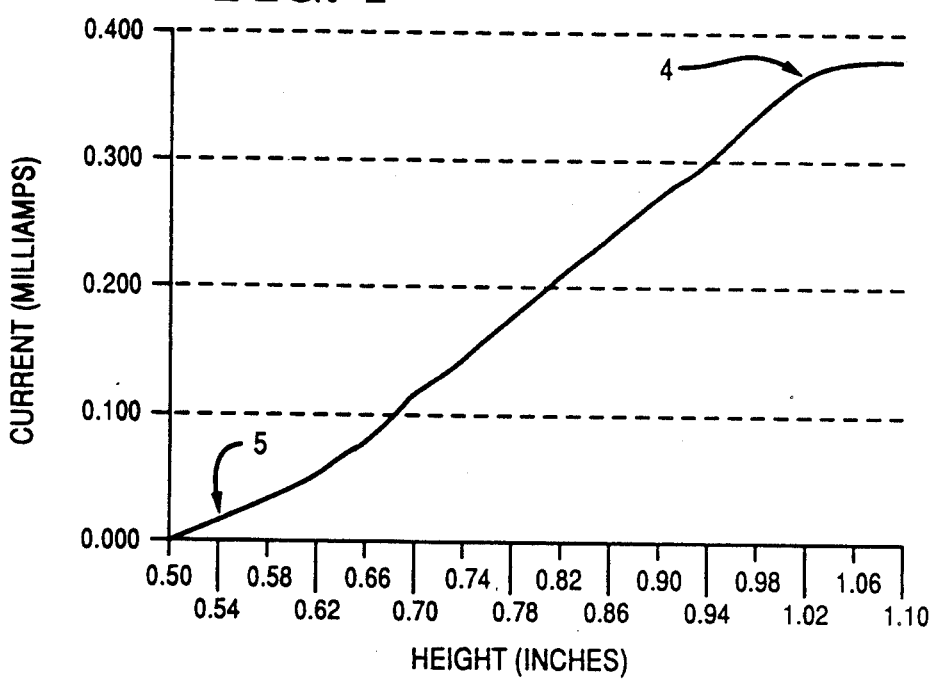
FIG. 4 is a graphical presentation of the collector current signal strength as a function of the vertical displacement for the specific embodiment represented by the actuator of FIG. 2.

FIG. 4 is an actual graphic presentation of the collector current signal strength as a function of the vertical displacement for the specific embodiment represented by the actuator of FIGS. 2A-2E. It clearly demonstrates continuous linearity and expansion of the linear region. When the flag is in a rest or "up" position 4, the collector current signal strength is high. When the flag is vertically lower or in a "down" position 5, this collector current signal strength is lower or low respectively.

Figure 5:
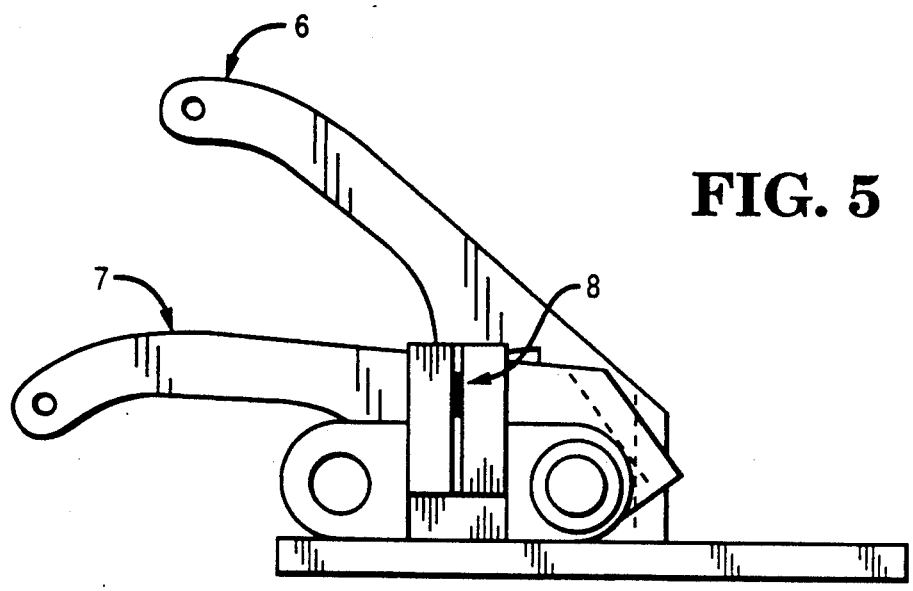
FIG. 5 shows an expanded side view of the specific embodiment of the actuator or flag of FIG. 2 in its fully-up or rest position and in its fully depressed state, showing its movement across the aperture of its associated opto-electronic sensor.
Figure 6:
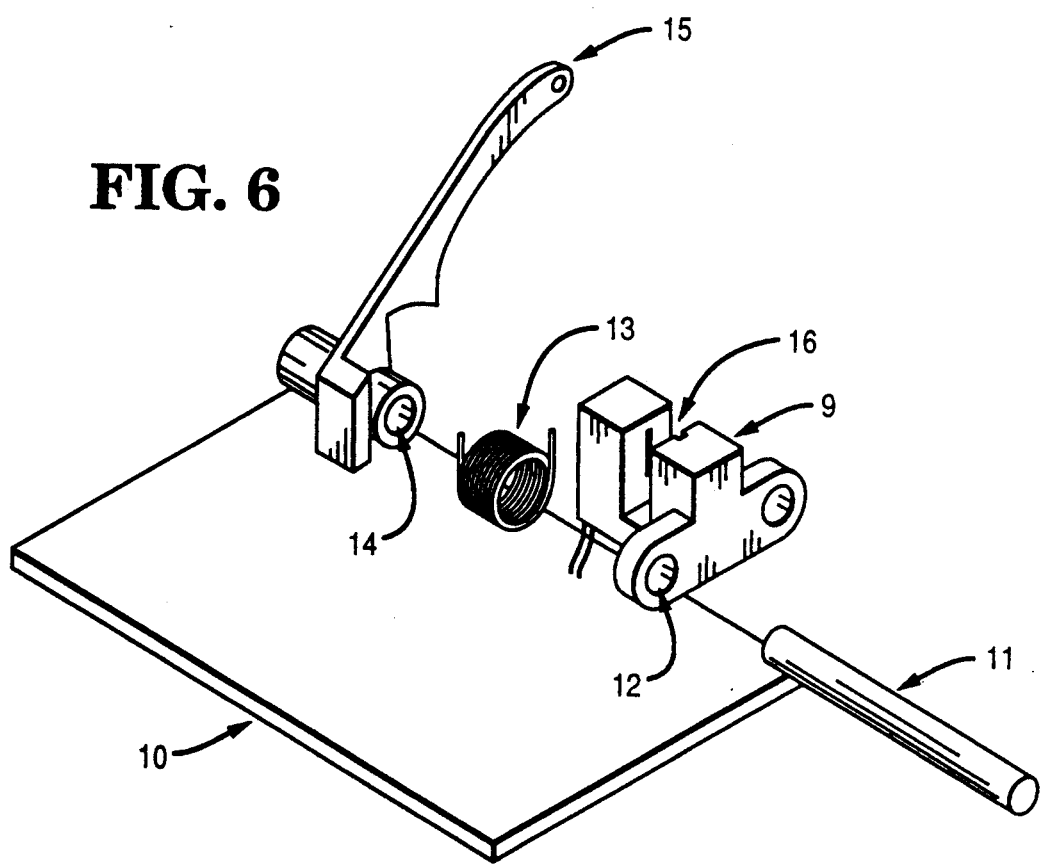
FIG. 6 is a perspective view of the preferred device of the invention, comprising one opto-electronic sensor, a spring, the specific embodiment of the actuator or flag of FIG. 2, a stainless steel shaft for interconnecting the above components, and a portion of a circuit board on which the above components are contained.

FIG. 5 shows an expanded side view of the specific embodiment of the actuator or flag of FIG. 2 in association with its opto-electronic sensor. The view shows the actuator in its fully-up or rest position 6 and in its fully depressed state 7. As indicated in FIG. 5, the dimensional characteristics of angular shape 2 FIG. 1A are such that the flag impinges into the aperture 8 of the opto-electronic sensor sufficiently far enough, both in the fully-up and fully depressed state, to avoid distortions caused by reflectivity and premature pinch-off at the two ends of the aperture. This assures that the opto-electronic sensing device will operate and remain in the linear region and be monotonic. This also assures smooth operation of the software Referring now to FIG. 6, an opto-electronic sensor 9 is mounted on circuit board 10, and a steel shaft 11 is used to go through an "ear" 12 of the opto-electronic sensor package 9, through spring 13, and through the pivot hole 14 of the actuator or flag 15. The actuator or flag 15 simply pivots on the shaft 11 such that when a player depresses the key 17 (see FIGS. 7A and 7B) the flag 15 pivots into slot 16 across the aperture and interrupts the light signal from the LED of the opto-electronic sensor 9 and causes the collector current generated in the phototransistor section of the opto-electronic sensor 9 to decrease. The actuator or flag 15 is biased up against the bottom of a key by the spring 13 at all times. However, the spring constant is such that experiments performed on the preferred embodiment of the invention in piano actions have shown that players could not tell that there were opto-electronic switches underneath the keyboard. The system is virtually undetectable and is completely unobtrusive, both in apperance and in key action.

The opto-electronic sensors are standard devices known in the art, such as Sharp GPIS51 photointerruptors. The photointerruptor 9 in FIG. 6 contains a slot 16 and comprises a light emitting diode (LED) on one side of the slot and a phototransistor on the other side (the LED and phototransistor are not shown separately). When light from the LED impinges on the phototransistor, an analog collector current proportional to the intensity of light is produced as is well known in the art. Thus, given the bias of the phototransistor amplifier circuit (not shown), the output voltage of this amplifier is inverse to the strength of the collector current (i.e. when the collector current is high, the output voltage is low, and when the collector current is low, the output voltage is high).

Referring to FIGS. 7A and 7B to describe the principle of operation, when the piano key 17 is in an "up" or rest position (see FIG. 7a), the analog voltage signal strength is low. As the key is depressed, flag 18 pivots downward causing a vertical displacement of angular shape 2 (see FIG. 1A) of the flag to impinge more and more into the aperture of the photointerruptor 19, interrupting the light signal from the LED and causing the analog voltage generated in the phototransistor to increase linearly. When the key 17 is in a "down" position (see FIG. 7B), the voltage signal strength is high. As key 17 is released and is in an upward motion, flag 18 would be displaced more and more out of the aperture, allowing more portions of the light from the LED to impinge on the phototransistor, thereby linearly decreasing the analog voltage generated by the photointerruptor 19. When the key 17 is in an "up" or rest position again (see FIG. 7A), the voltage signal strength would again be at its low value.

Referring back to FIG. 6, in the preferred embodiment the shaft 11 is made of stainless steel type 304, which is common to the art. Stainless steel is used because it will not corrode or rust and therefore build up resistance to the pivoting action of the actuator or flag 15. As to the manufacturability of the flag 15, it is injection molded from a compound consisting of 90% acetal and 10% PTFE (Teflon, which is a trademark of E.I. DuPont Corp.). It is very economical and easy to manufacture. Additionally, the compound has self-lubricating properties to reduce wear at the contact points and is very strong and durable for reliable operation. Thus, the embodiment of this invention is very cost effective with respect to prior art devices. It is also very simple, the opto-electronic displacement or displacement speed sensing device containing only four basic parts requiring easy manufacturing or assembly.

Figure 8:
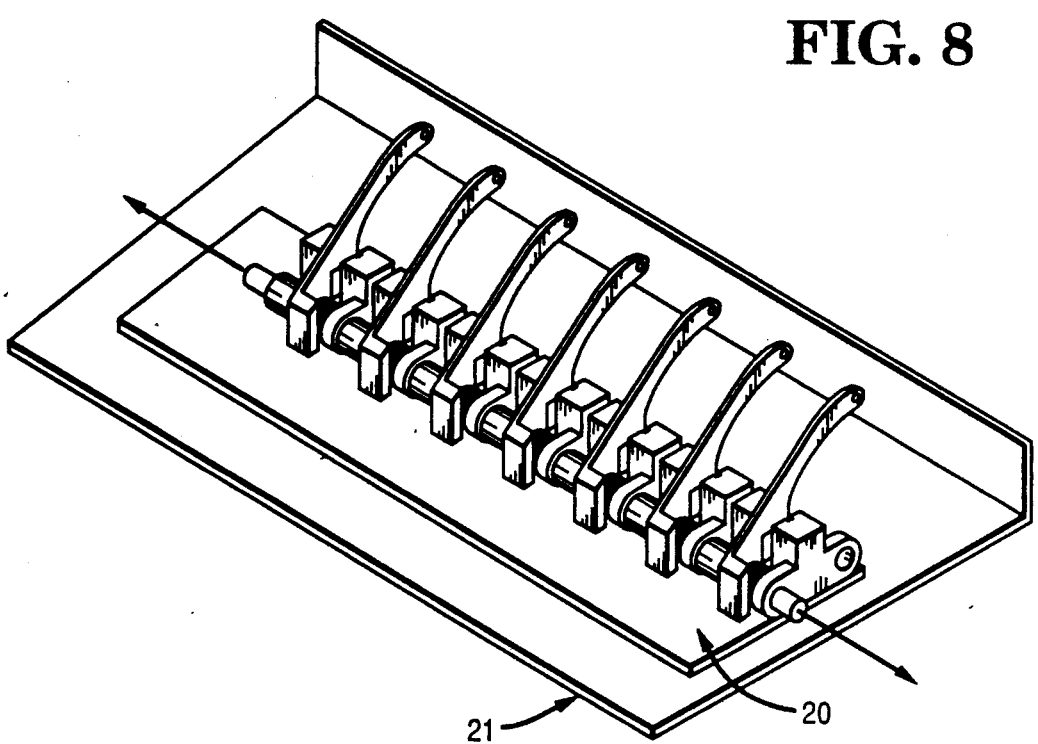
FIG. 8 is a perspective view of a plurality of opto-electronic sensing devices of the present invention arranged in a single line.

FIG. 8 shows a plurality of opto-electronic sensing devices arranged in a single line, one for each piano key, and each of which comprises a flag or actuator connected to its associated photointerruptor. They are all mounted on circuit board 20, with the circuit board mounted on a chassis 21. In the preferred embodiment, a thin steel plate with zinc plating is used as the chassis 21. Circuit board 20 is then simply screwed directly onto the steel plate of the chassis 21 by means of threaded standoffs, which are common in the art. The steel chassis 21 containing the plurality of photo-electronic sensing devices is then simply screwed onto the keybed underneath the keyboard, with one opto-electronic sensing device under each associated piano key. The steel chassis 21 is used to provide a firm foundation or base to eliminate movements (vibrational or flex) that could occur if the circuit board was screwed on directly to the keybed, and the keyboard was struck by a player with sufficient force.

The unique design and functionality of the invention is clearly evident in FIG. 8. Not only is it simple and cost effective, but it is also compact. Additionally, it is easily expandable when manufactured to accommodate any size piano keyboard by simply connecting more photointerruptors with their associated actuators.

Figure 9:
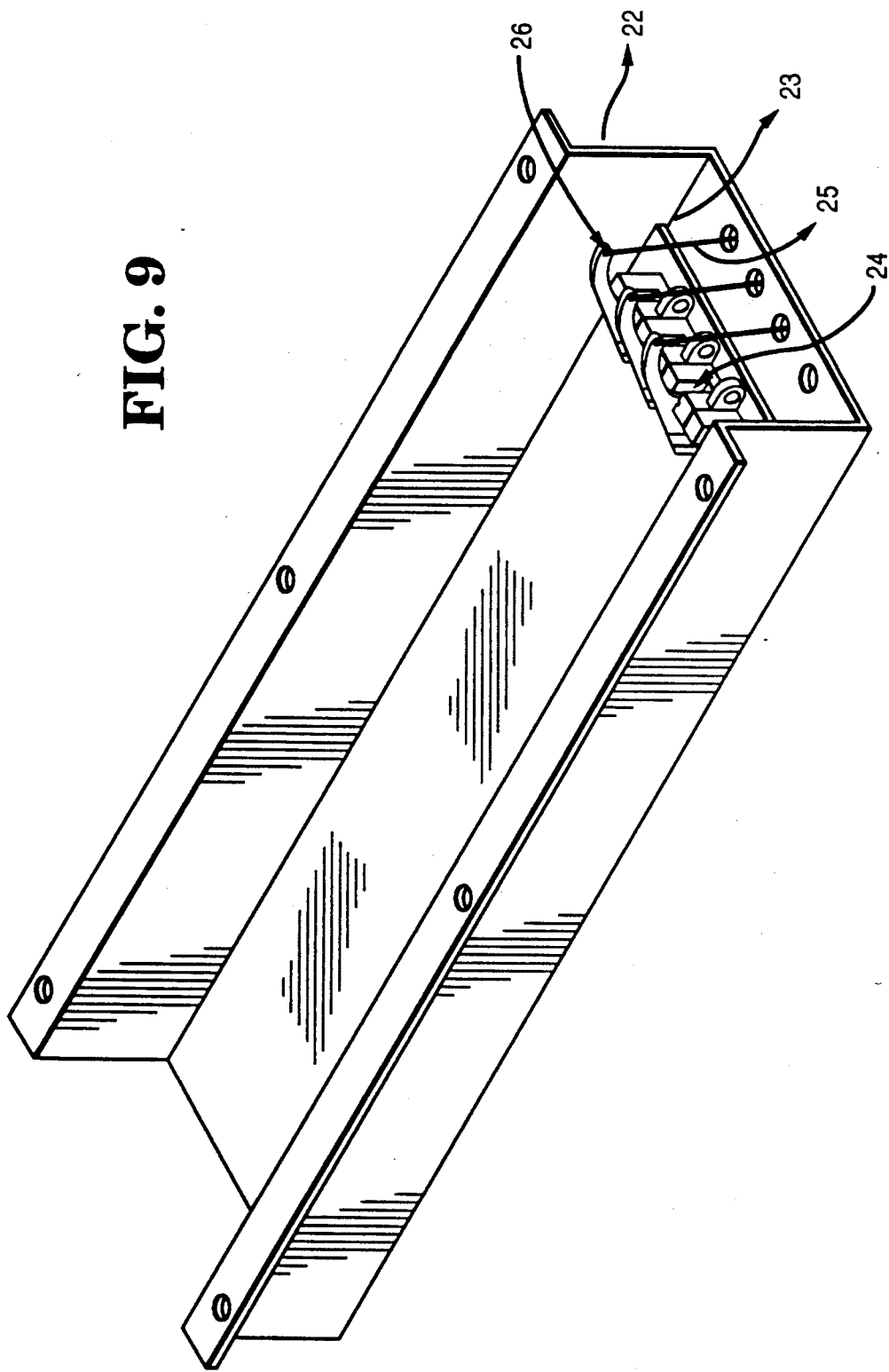
FIG. 9 is a perspective view of the metal chassis and circuit board containing the opto-electronic sensing devices of the present invention with cabling means for attachment to foot pedals.

Referring now to FIG. 9, a thin steel plate chassis 22 is used on which a circuit board 23 is mounted. The circuit board 23 is simply screwed directly onto the bed of the steel plate chassis 22 by means of threaded standoffs, which are common in the art. On one end of the circuit board 23, a plurality of opto-electronic sensing devices 24 are arranged in a single line, one for each foot pedal of the piano. Actuation of the foot pedals is accomplished by a simple cabling means 25 which is attached to the actuator at the top through a small hole 26 (i.e. the hole is manufactured into the actuator or flag when injection molded) and to the pedal mechanism as appropriate at the other end (not shown). As to the principle of operation to produce pedal signals, when the pedal is in an "up" or rest position, the output voltage signal strength of the phototransistor amplifier circuit is low. As the pedal is depressed, the corresponding actuator or flag is forced to pivot downward by means of the connecting cable 25. This downward displacement of the actuator interrupts the light signal from the LED and causes the analog voltage generated at the output of the phototransistor to increase.

Figure 10:
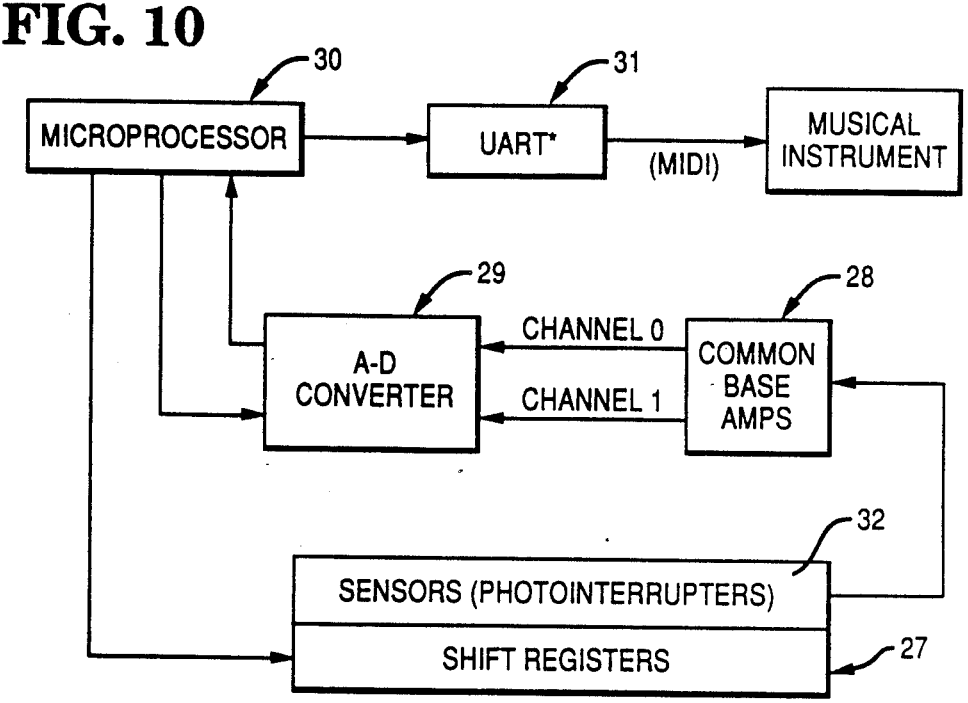
FIG. 10 is a diagram of the major components of the scanning and detection circuitry.

Referring now to FIG. 10, which is a block diagram of the major components of the processing circuitry (i.e. scanning and detection), circuit board 23 in FIG. 9 contains all of the scanning and detection circuitry (not shown) except for the shift registers 27, which are contained by the circuit board 20 (see FIG. 8) which is the circuit board containing the opto-electronic sensing devices for the keys. In the preferred embodiment, the steel plate chassis 22 is painted and is screwed in place underneath the keybed and behind the kick panel/knee panel, appropriately located for convenient attachment by cabling means to the pedals or pedal mechanism. In a grand piano, chassis 22 goes underneath the keybed and behind what is known in the art as the lyre, containing the pedal assembly mechanism.

FIG. 10, as previously stated, is a block diagram of the preferred scanning and detection circuitry embodied in the invention. The components depicted are known in the art and thus, only a general description will be provided. The major components of the circuitry preferably comprises shift registers 27, common base amplifiers 28, an analog to digital (ADC) convertor 29, a microprocessor 30, and a universal asynchronous receiver transmitter chip (UART) 31. The microprocessor 30 controls the shift registers 27 to enable an LED in a photointerruptor 32 corresponding to an individual movable element or key, thus allowing the acquisition of analog voltage data. The shift registers 27 sequentially activate the corresponding LEDs contained in the photointerruptors 32. This sequencing minimizes power requirements because at any one point in time only one LED emits light to be detected by its corresponding phototransistor. On a next positive-going clock pulse, the shift registers 27 select the next key or movable element on the keyboard. If there were, for example, 100 keys or movable elements on a keyboard that were to be scanned, and the scan rate selected was 1 millisecond, which has been proven to be a desirable rate for scanning keyboards, then each photointerruptor 32 for a corresponding key or movable element would be enabled for only 10 microseconds. Thus, the photointerruptors need to be able to operate very rapidly. However, the phototransistors in each corresponding photointerruptor 32 have a significant time delay in returning to an off state because the charge contained in the phototransistors depletes relatively slowly. In order to increase the response time of the phototransistors and eliminate any spurious signals which can lead to erroneous voltage readings, it is necessary to rapidly discharge any residual voltages in the base of the phototransistor before the next cycle. In the preferred embodiment, common base amplifiers 28 are used as a source to speed up the decay of the charge built up in the base of the individual phototransistors. The common base amplifiers 28 maintain a constant collector voltage, thereby preventing a Miller capacitance effect between the collector and base voltages of the phototransistor. In the preferred embodiment, two common base amplifiers 28 are utilized, whereby the collectors of the phototransistors are cross-coupled together in a manner such that every other phototransistor is alternately connected to one of the two common base amplifiers 28.

As stated previously, the data derived from the displacement or displacement speed sensing device of the invention comprises an analog voltage signal generated by the phototransistor corresponding to each photointerruptor 32 of each key or movable element, which is inversely related to the amount and intensity of light impinging upon the phototransistor as its corresponding LED is activated. In the preferred embodiment of this invention, the voltage data is then serially transmitted through the appropriate common base amplifier 28 (i.e. which effectively create a cascode amplifier by utilizing common base amplifiers 28 to speed up the response time of the phototransistors) to a sample-and-hold circuit (not discretely shown), forward to the input of an analog-to-digital (A/D) convertor 29 for digital transmission to the microprocessor 30. The microprocessor 30 then executes program instructions, i.e. program instructions and data conversion methods are contained in Programmable Read Only Memory (PROM)/Read Only Memory (ROM) not shown. Data from each movable element or key is then acquired, analyzed, and transmitted through the universal asynchronous receiver transmitter chip (UART) 31. The flow charts of FIGS. 12A, 12B, 13A, 13B, 14A, 14B, 15, 16, 17A, 17B, 18A, 18B, 19A and 19B show preferred operation and decision boxes representative of the instructions run by the microprocessor 30 to extract note and note expression data from the output of the ADC 29. The microprocessor 30 further converts the data, utilizing additional data conversion methods, to a computer-compatible bus and protocol specification, such as MIDI.

FIGS. 12A, 12B, 13A, 13B, 14A, 14B, 15, 16, 17A, 17B, 18A, 18B, 19A and 19B represent flow charts of three of the five different aspects or procedures of the system software of the preferred embodiment of the invention. Appendix A gives a simplified explanation of each of the five procedures and contains ANSI C code that can be compiled with industry standard C compilers. Anyone skilled in the art could reference the industry-standard reference manuals to understand and replicate the software of the preferred embodiment.

Figure 12A:
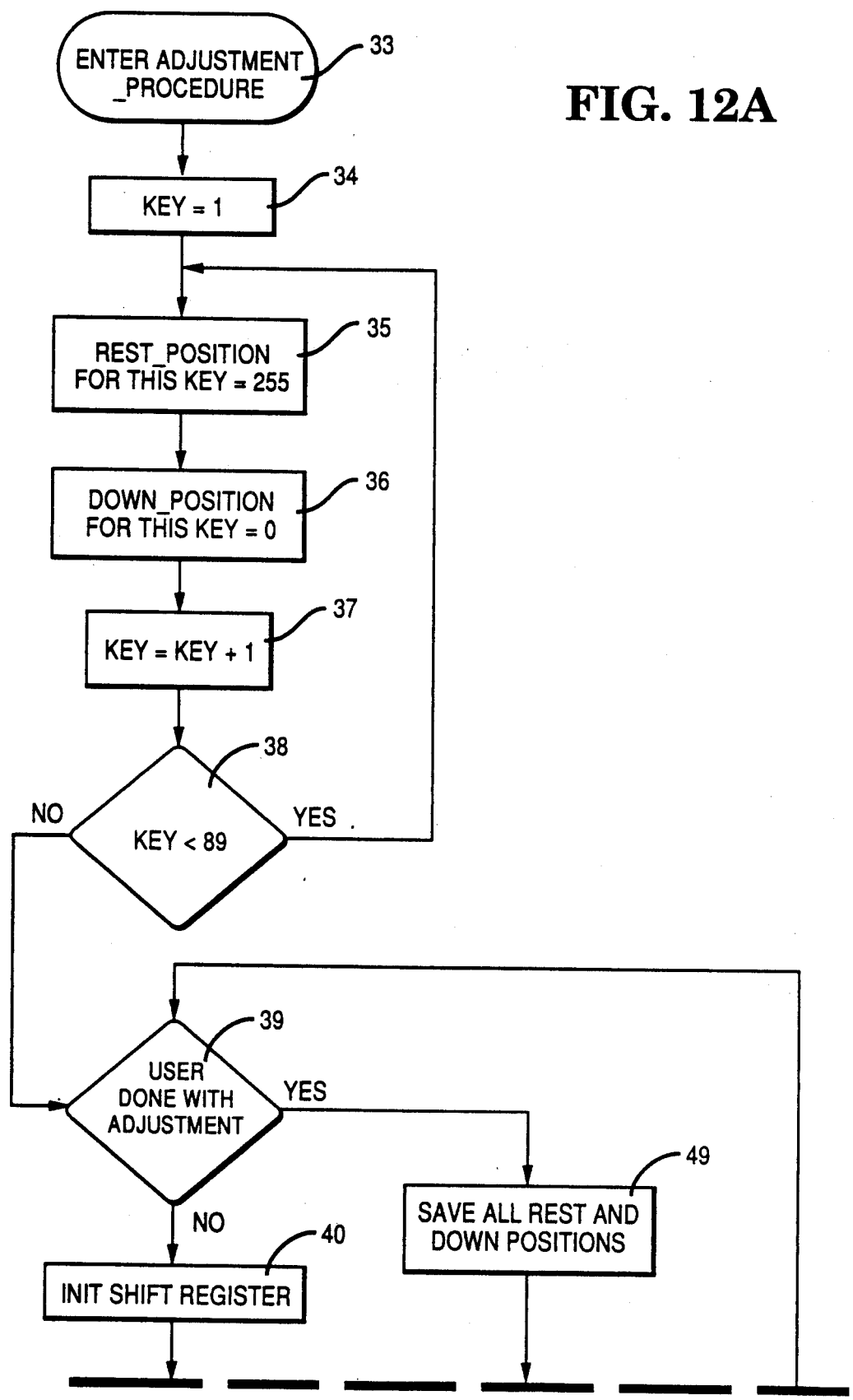
FIGS. 12A and 12B when joined together form a flow chart of the Adjustment Procedure according to one embodiment of the invention.
Figure 12B:
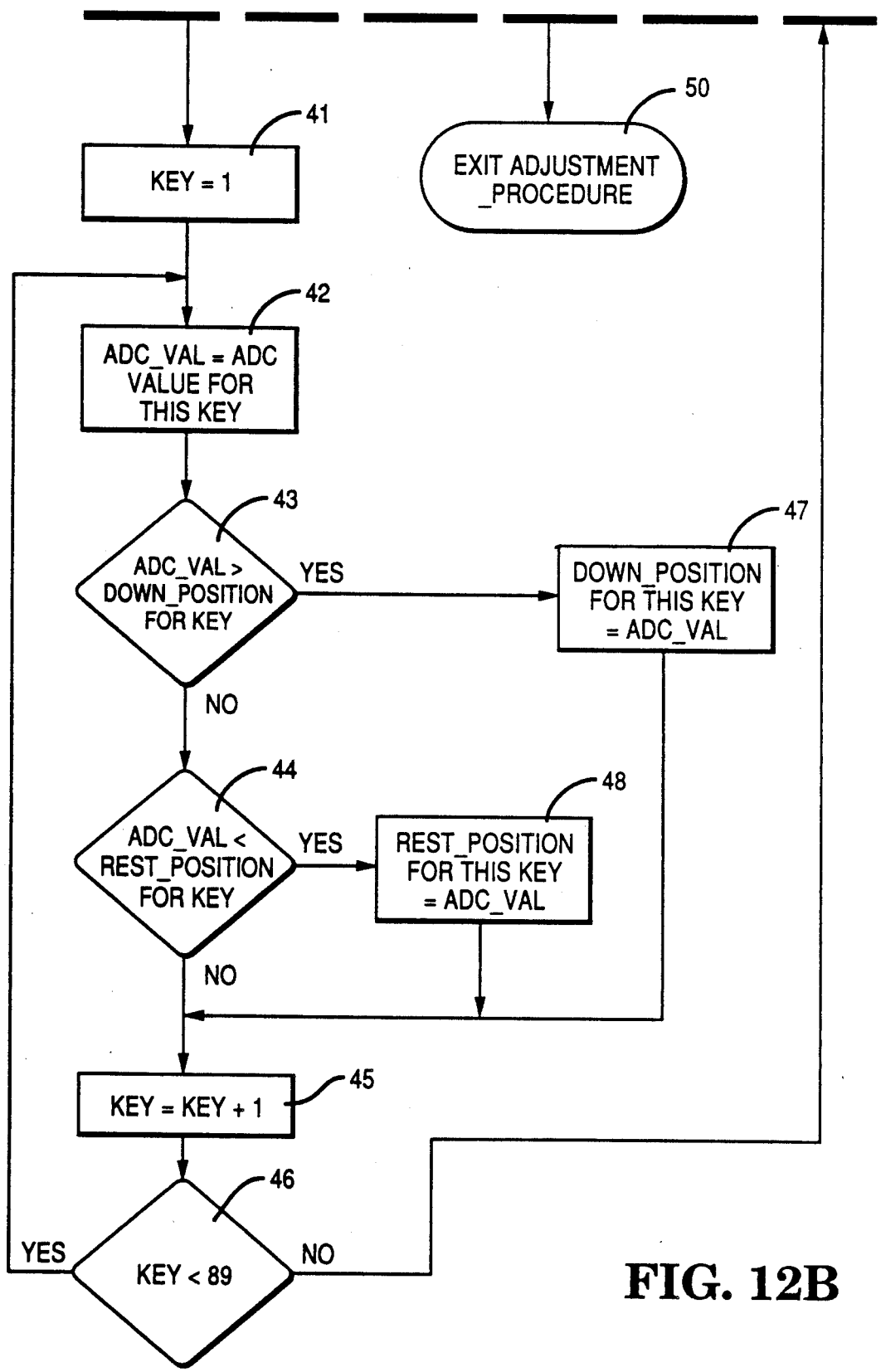

Data processing as shown in FIGS. 12A, 12B, 13A, 13B, 14A, 14B, 15, 16, 17A, 17B, 18A, 18B, 19A and 19B begins after the scanning and detection circuitry of this invention is enabled. The microprocessor 30 responds to a reset signal and initializes the variables specified in the General Givens (see pages 2 and 3, Appendix A). The General Givens are basically just declarations, general functions, and global variables. Once the system is initialized to the variables specified in the General Givens, the system moves to the Main Procedure (see page 9, Appendix A). The objective of the main procedure is to call the Init Procedure (FIGS. 13A and 13B), then loop continuously between the Scan Procedure (FIGS. 14A, 14B, 15, 16, 17A, 17B, 18A, 18B, 19A and 19B) while testing to see if the user wants to enter the Adjustment Procedure (FIGS. 12A and 12B). Background procedures may deal with interrupt-level communication, maintenance of the system timer, etc.

Figure 11:
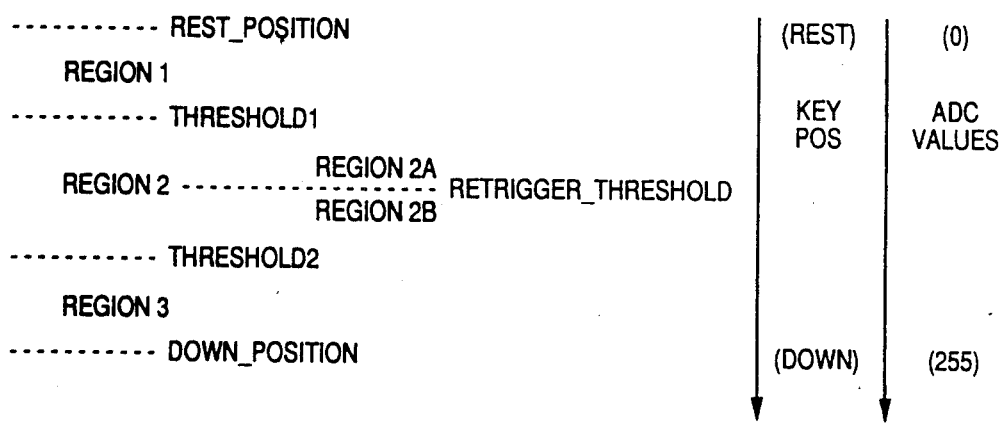
FIG. 11 shows the regions and thresholds of the key position and the analog-to-digital convertor value orientation used by the software implementation.

FIG. 11 describes the analog to digital convertor (ADC) position terminology which is necessary to understand the procedures represented by the flow charts of FIGS. 12A, 12B, 13A, 13B, 14A, 14B, 15, 16, 17A, 17B, 18A, 18B, 19A and 19B. FIG. 11 details all the regions and the names of the thresholds and the orientation of the key or movable element position versus ADC values. The methodology of the present software system is that at rest the key or movable element has a low ADC value, and as the key or movable element is depressed the ADC value increases. Although this is the preferred methodology of the system software of this invention, the convention could easily be reversed so that depression of the key or movable element would represent decreasing ADC values.

FIGS. 12A and 12B is a flow chart representing the Adjustment Procedure of the invention software. The objective of the Adjustment Procedure is to establish the rest position and down position for each key or movable element, then store these values in writable nonvolatile storage (i.e. in the preferred embodiment EEPROMs are utilized). These variables are stored as individual byte arrays, the length of which is equal to the number of keys scanned (i.e. NUM_OF_KEYS General Givens, Appendix A).

Referring now to FIGS. 12A and 12B, the Adjustment Procedure is entered 33 by calling the subroutine from the Main Procedure (see Appendix A). Box 34 on the flow chart, which is represented by KEY =1, identifies the particular key which is being strobed and sampled. This is incremented from 34 KEY=1 to the number of keys covered by the device of the invention; for example, on a standard acoustic eighty-eight key piano, the values would be increased to KEY=88. The maximum value of the increments would be increased for other signal inputs to the system, such as pedal signals carrying sustain pedal information. For the purposes of Appendix A and FIGS. 12A, 12B, 13A, 13B, 14A, 14B, 15, 16, 17A, 17B, 18A, 18B, 19A and 19B, a standard acoustic piano with eighty-eight keys is represented with no pedal signals. During the conversion cycle of 34 KEY=1, the rest position 35 and the down position 36 are initialized at the maximum and minimum ADC values. In the preferred embodiment, an 8-bit analog-to-digital convertor is used. Thus, the rest position is initialized to an ADC value of 255 and the down position is initialized to an ADC value of 0. The initialized values are set at the opposite range or convention described in FIG. 11, but are utilized to establish the correct values and convention as the Adjustment Procedure is completed. When the rest and down position ADC values for the first key 34 are initialized, the program increments to the next key 37 KEY=KEY +1. This value is compared to 38, the maximum number of keys plus 1. If 37 KEY=KEY+1 is less than the value in 38, the key 37 is initialized to the rest 35 and down 36 positions as previously, and the program then increments to the next key 37. This process continues until all the key rest and down positions are initialized to the same rest 35 and down 36 ADC values. The user is then prompted to 39 as to whether they are done with the Adjustment Procedure. Since it is not at this point, the program goes to the init_shift_register function 40. This function initializes the hardware to start scanning the photointerruptor 32 ADC values beginning at the first key 41. To initialize the hardware and to reset the shift register to enable and sample the first key, the microprocessor first writes a 0 bit on a latch that inputs into the shift register 27. The microprocessor 30 then sends out a negative read pulse to the ADC 29. At the rising edge of the negative read pulse from the microprocessor 30, the ADC 29 outputs a clock pulse (i.e. the phototransistors of the corresponding photointerruptors 32 are sampled during the conversion cycle of the pulse), which is also forwarded to the shift register 27. At the falling edge of the clock pulse from the ADC 29 a sample/hold gate is opened and data conversion of the analog signal begins. At the rising edge of the pulse, the digital conversion is complete and the shift register 27 is initialized to the next conversion cycle (i.e. the shift register is ready to enable and sample the next key). When the microprocessor 30 outputs the read pulse to the A/D convertor 29, data from the previous conversion cycle is read by the microprocessor 30.

When the init_shift_register function 40 is completed, the first key 41 KEY=1 is enabled and sampled in its nominal rest position. When the conversion cycle is completed, the microprocessor 30 reads the ADC value for this key 42 and then compares this value to the initialized down position value 43. Since the actual ADC value of the rest position of the key will always be greater than the initialized down value of 0, the down position of the KEY=1 is initially established 47 at the sampled rest position value of 42. The program then increments to the next key 45. If 45 KEY=KEY+1 is less than the value in 46 (i.e. which is the maximum number of keys plus 1), the program then enables and samples this next key in its rest position 42, compares 43 this actual ADC value to the initialized down position value of 0, establishes 47 the initial down position value of the key at the sampled rest position 42, and then the program again increments to the next key 45. This process continues until all of the keys are sampled and their initial down ADC values established at each respective key's rest position. At this point 46, the user is again prompted 39 as to whether the Adjustment Procedure is completed. Since it still is not, the program executes the init_shift_register function 40, initializes to the first key 41, and samples its nominal rest position 42. This ADC value 42 is then first compared 43 to the initial down_position ADC value obtained in the previous scan. Since they are equal (i.e. the key has not moved), the program then increments to 44, where the actual rest position ADC value is compared to the key's initialized rest position ADC value 35 of 255. Since the actual ADC value of the rest position of the key will always be less than the initialized rest position of 255, the rest position of KEY=1 is established 48 at the sampled rest position ADC value 42. The program then increments to the next key 45 and the same process continues until all of the keys are sampled and their actual rest ADC values established. Thus, in the above procedure, the down position value and the rest position value are both set to the same ADC value that represents the rest position.

At this point, since the loop control does not distinguish between scanning for key down positions versus rest positions, actual down position values are not established until the user depresses every key. As the first key is depressed to its nominal down position, it is enabled and sampled 42. The program then compares this actual nominal down position ADC value to the initial down position value 43. Since the actual ADC value of the down position will always be greater than the initially established down position ADC value which is equal to the rest position value (i.e. established during the first scan of the Adjustment Procedure), the nominal down position of the key is established at its actual ADC value 47. The next key 45 KEY=KEY+1 is then selected in the scan. If 45 KEY=KEY+1 is less than the value in 46 (i.e. which is the maximum number of keys plus 1), the program then enables and samples this key in its nominal down position 42, compares this actual nominal down position ADC value to the initially established down position value (i.e. equal to the rest position value), establishes the actual down position at the key's sampled nominal down position ADC value 47, and then the program increments to the next key. This process continues until the user has depressed all of the keys (i.e. the program has enabled and sampled all of the keys in their nominal down position) and their actual nominal down position ADC values are established. At this point, the program at 46 executes to 39, the user indicates completion with adjustment, the program saves all of the actual rest and down positions of the keys in non-volatile memory 49 and the user exits from the subroutine 50. It should be noted that although there are various ways for a user to initiate/enter and exit the Adjustment Procedure, in the preferred embodiment of this invention, access to and exit from the Adjustment Procedure is initiated from a control panel.

Figure 13A:
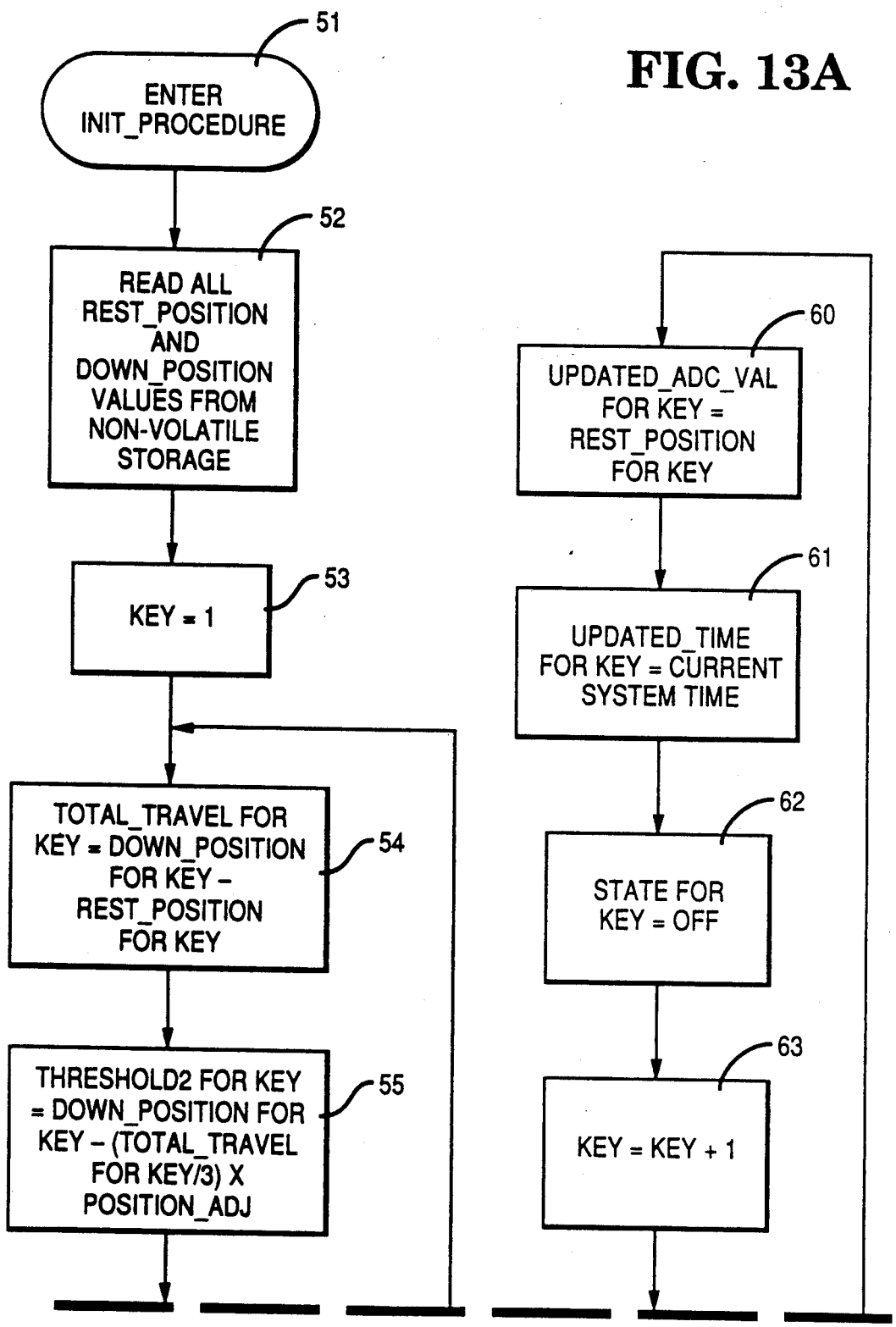
FIGS. 13A and 13B when joined together form a flow chart of the Init Procedure according to one embodiment of the invention.
Figure 13B:
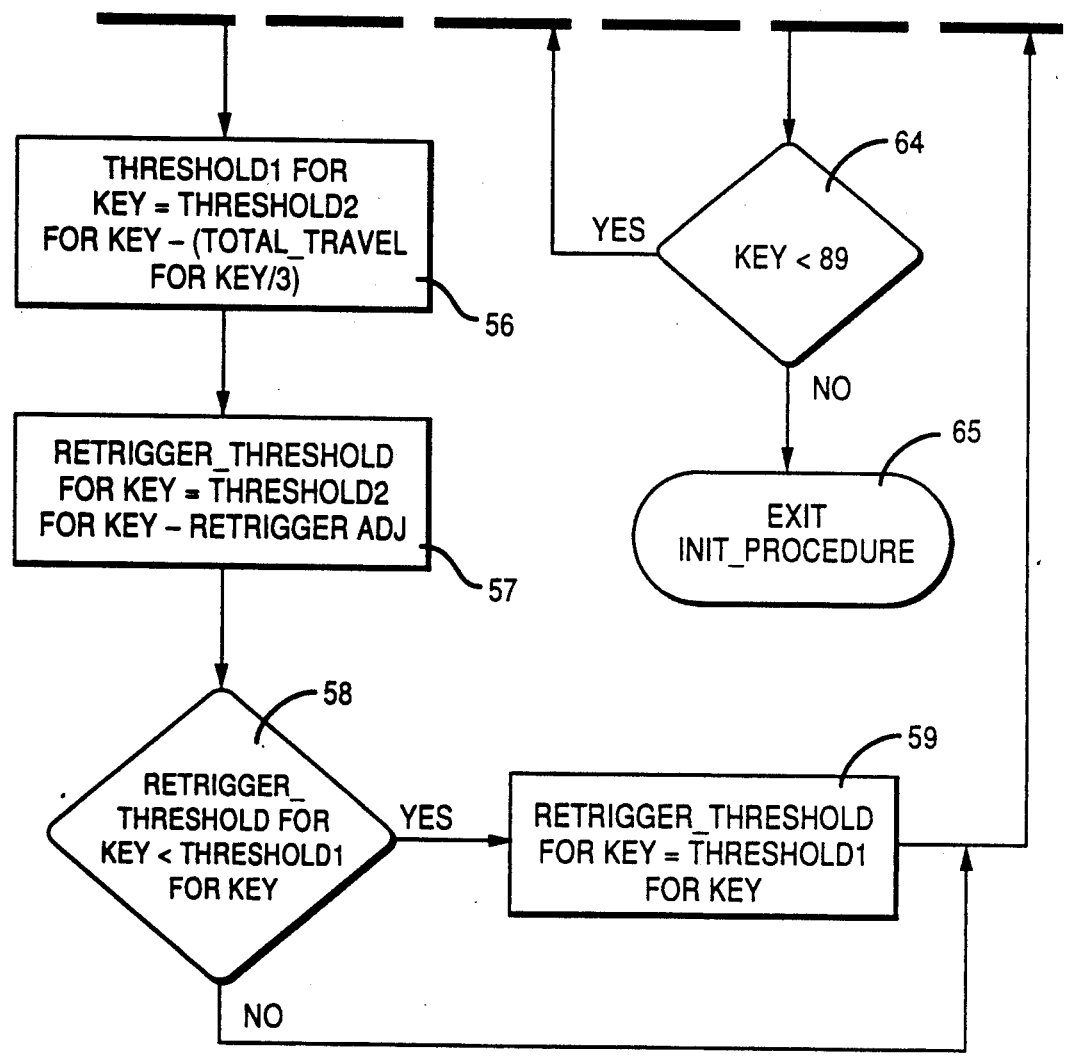

FIGS. 13A and 13B is a flow chart representing the Init Procedure of the preferred embodiment of the invention. The objective of the Init Procedure is to read the rest_position and the down_position for each key from non-volatile storage, then calculate the total travel, threshold1, threshold2 and retrigger_threshold for each key. These variables are stored as individual byte arrays, the lengths of which are equal to the number of keys scanned. In addition, the global variables position_adj and retrigger_adj are user adjustable and are used to determine some of the array variable values. The position_adj variable serves to move threshold1, threshold2 and the retrigger_threshold equally up or down. The retrigger_adj variable serves to control the "distance" between threshold2 and the retrigger_threshold. Lastly, the Init Procedure sets the updated_ADC_value of the keys to the rest_position, updated_time to the current system time, and state to off. These three variables are also stored as individual arrays, the length of which is equal to the number of keys scanned.

Referring now to FIGS. 13A and 13B, the Init Procedure is entered 51 by calling the subroutine. The program then first reads all of the rest and down position ADC values 52 from the non-volatile storage. This assumes that the Adjustment Procedure has occurred in the past. If an Adjustment Procedure was not previously conducted the program (not shown in flow chart) will find a check-sum error in the EEPROM, will know that an adjustment was not done, will set the variables at nominal values so that the system won't crash, and will notify the user via the control panel that an adjustment needs to be initiated. Once the rest and down position values are read 52, the program initializes to the first key 53 KEY=1 and then calculates the total travel for the key 54, which equals the down_position minus the rest_position of the key. The program then uses this calculation 54 for total travel and calculates 55 threshold2, 56 threshold1, and 57 the retrigger_threshold. The computations for the thresholds 55, 56 and 57 are dynamic, and can be established anywhere between the rest and down position values. As an example, the computation 55 for threshold2 is equal to the down_position for the key minus some amount from the bottom, and this amount that is subtracted is equal to the total travel for the key divided by three, which is then multiplied by the position_adj variable. However, the division in the above computation can use any segmentation constant (i.e. or user defined variable), not just the value of three which is used in the flow chart. Also, as stated previously, position_adj is a variable that serves to move threshold1, threshold2 and the retrigger_threshold equally up or down. The position_adj variable is a fractional number (i.e. binary faction) with an established range of between 1 and 16, where 8 is nominal. The position_adj variable is initiated in the preferred embodiment from a front panel mechanism. Thus, the value of the segmentation constant and the position_adj variable in the computations 55, 56 and 57 determine the position of the thresholds between the rest and down positions and the distance between the thresholds. This allows a player to dynamically adjust the thresholds to determine when an event (i.e. attack/release) should be generated. As an example, a user could adjust threshold2 (i.e. threshold2 is the threshold that signals an attack event) such that it would activate at the same time the actual hammer of the piano key hits the string. The other thresholds could also be adjusted similarly (i.e. for release events, re-attack, etc. to capture the full range of musical effects and more accurately mimic an acoustic piano action. Once the program executes the threshold computations 55, 56 and 57, the program goes to 58 where the ADC value of the retrigger_threshold is compared to threshold1. If the computed ADC value for the retrigger_threshold 57 is less than the computed ADC value of threshold1 56, the program executes 59 where the retrigger_threshold value is set at the threshold1 ADC value. Thus 58 is basically a clamping mechanism that does not allow the retrigger_threshold ADC value to be below the value for threshold1. From 59, the program then executes the instructions in 60 through 62 for KEY=1. In 60, the program copies the rest_position array into the updated_ADC_value array. In 61, the program sets the updated_time for the key to the current system time and then 62 initializes the state of the KEY=1 to off. This process 60, 61 and 62 initializes the variables for the KEY=1 so velocity can be computed in the Scan Procedure (see FIGS. 14A, 14B, 15, 16, 17A, 17B, 18A, 18B, 19A and 19B) in a situation where a player moves into region 3 (see FIG. 11) on the first scan (i.e. with significant force). When these instructions are completed, the program increments to the next key 63 KEY=KEY +1. This value is compared to 64, the maximum number of keys plus 1. If 63 KEY=KEY+1 is less than the value in 64, the key 63 is prompted through the program operations 54 through 62, where the thresholds for the key are established and initialization for the Scan Procedure accomplished. This process is reiterated until the threshold values and initialization for the Scan Procedure is established for all of the keys. The Init Procedure is then exited 65. It should be noted that the Init Procedure establishes two independently generated threshold ADC values for each key. This normalizes the voltage slopes in vertical movement for each key. Thus, variations in key thickness and gain differentials in the photointerruptors will be normalized for accurate velocity measurement. In prior art systems, key stroke velocity measurement assumes that all keys have the same voltage differential for an equivalent vertical movement, which results in poor velocity resolutions and consistency from key to key.

At this point, it is also important to note that the preferred hardware implementation includes a gain circuit that is utilized to optimize the plus and minus reference voltages for the A/D convertor 29 to maximize the total ADC value range over the total travel. As mentioned previously, the total ADC value range controls the resolution of the velocity measurement. In the preferred embodiment, this adjustment or expansion of the ADC value range occurs in the Adjustment Procedure (details have been removed from the flow chart in FIGS. 12A and 12B). This process is common to the art and will not be explained. However, the adjustment or expansion can also be established in the Init Procedure, but requires additional calculations.

FIGS. 14A, 14B, 15, 16, 17A, 17B, 18A, 18B, 19A and 19B are a collection of flow charts representing the Scan Procedure. The objective of the Scan Procedure is to detect key movement across previously initialized thresholds. Threshold detection controls the flow of the program and controls whether the updated_ADC_value and updated time arrays are updated. When control flow indicates an event needs to be transmitted, the Scan Procedure calculates the velocity based on the updated_ADC_value, updated time, and current ADC value for that key plus the current system time, then transmits the event via the MIDI port.

Figure 14A:
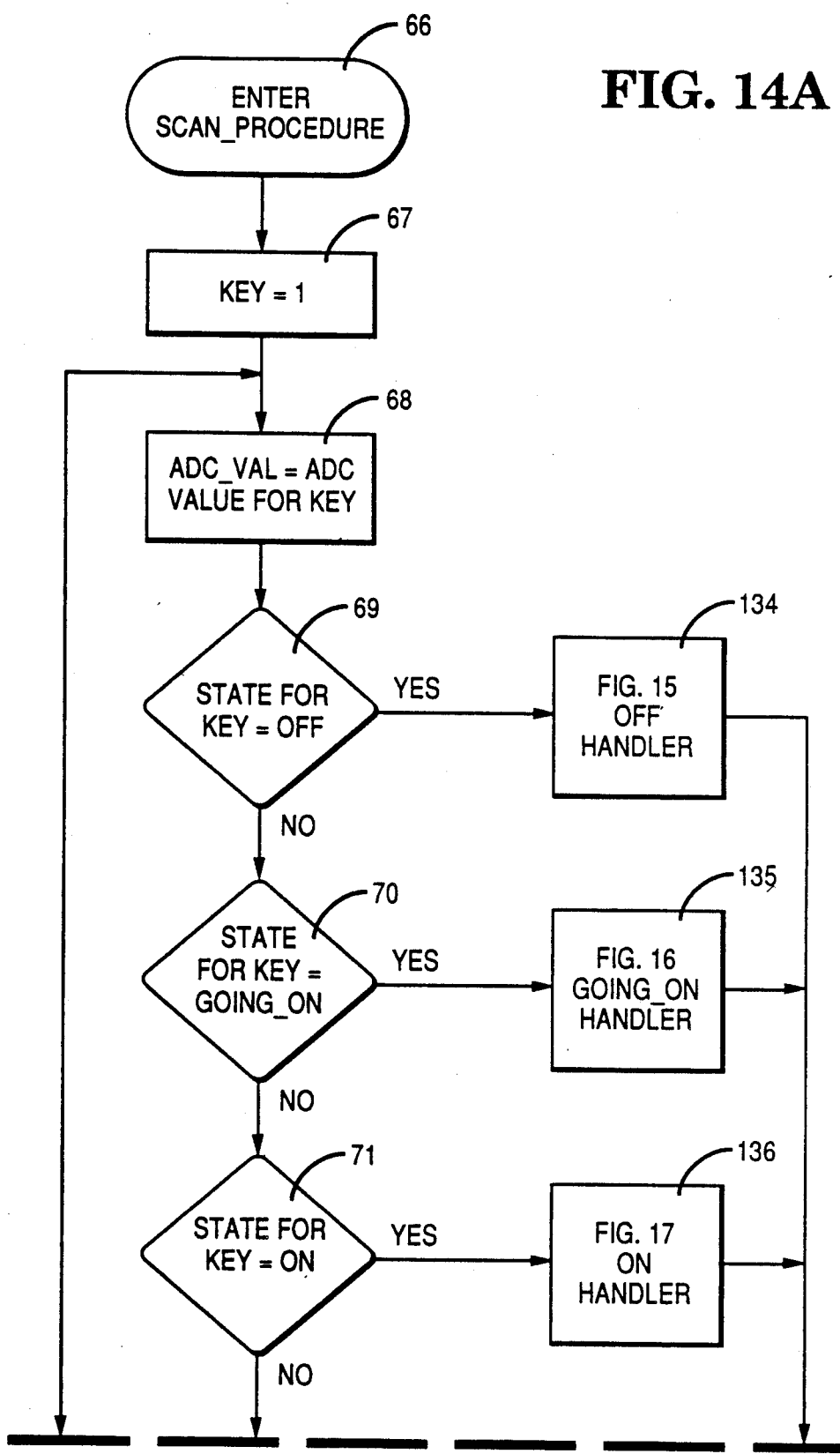
FIGS. 14A and 14B when joined together form a flow chart of the Scan Procedure according to one embodiment of the invention.
Figure 14B:
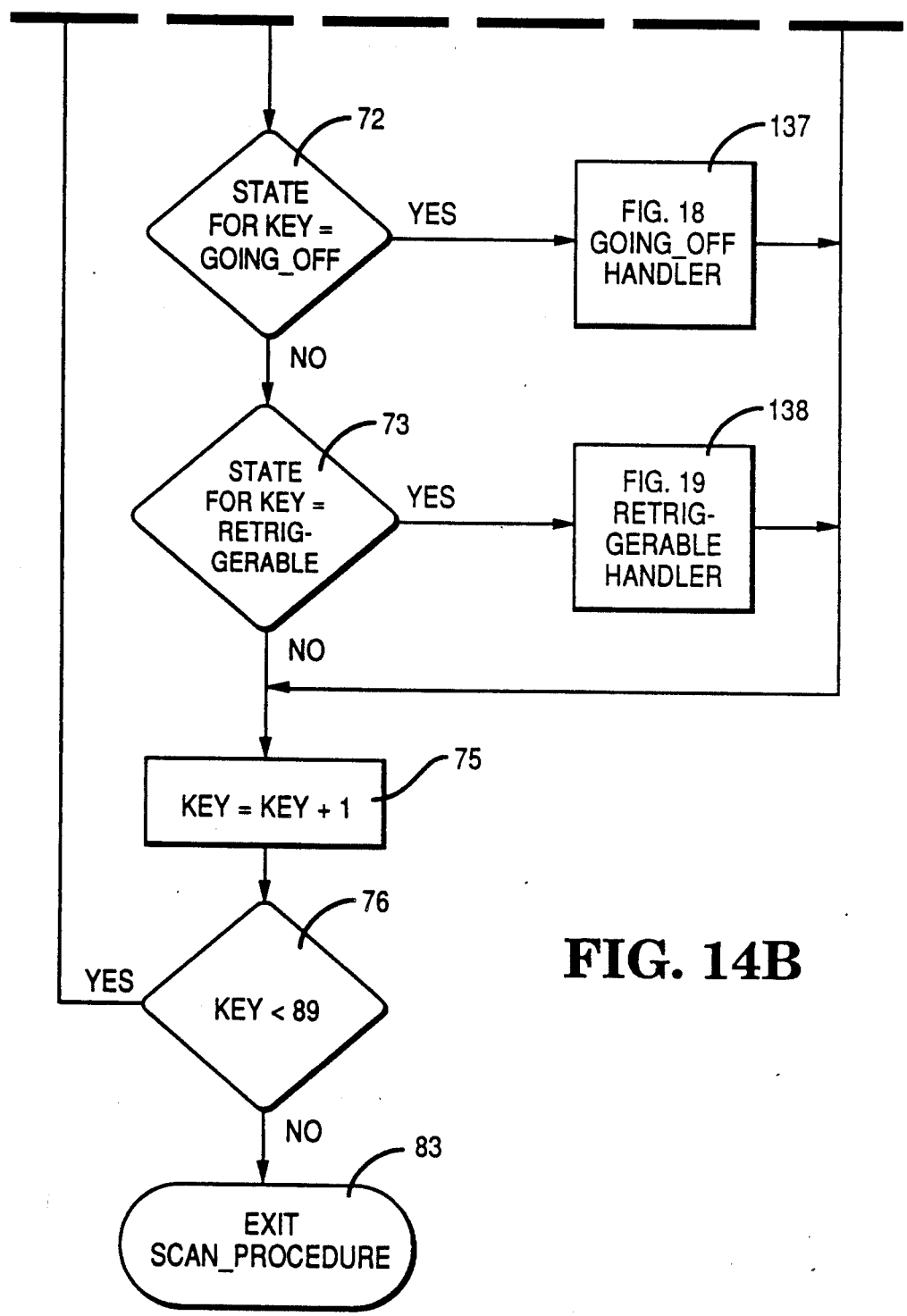
Figure 15:
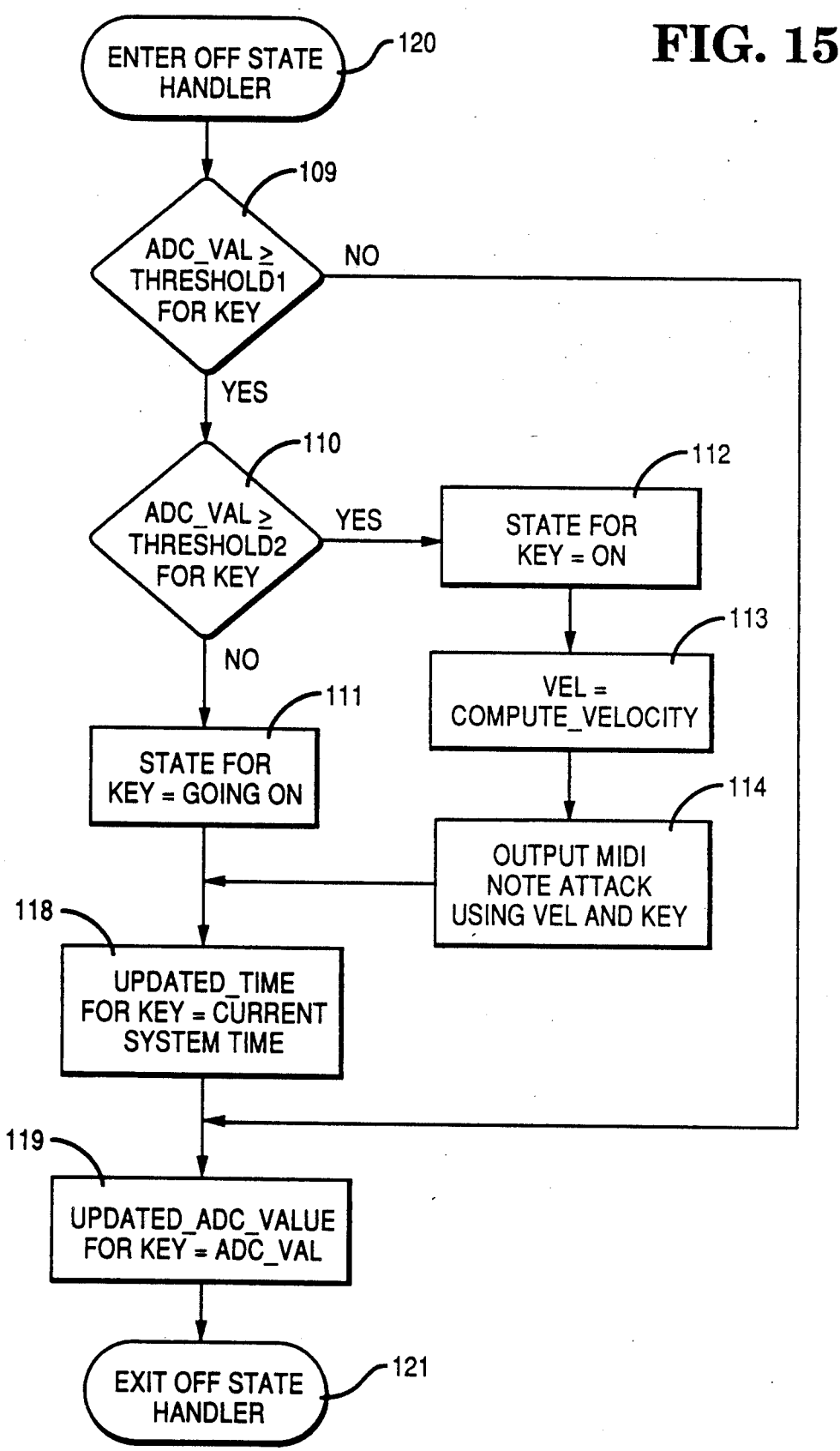
FIG. 15 is a flow chart of an OFF STATE HANDLER sub-procedure according to one embodiment of the invention.
Figure 16:
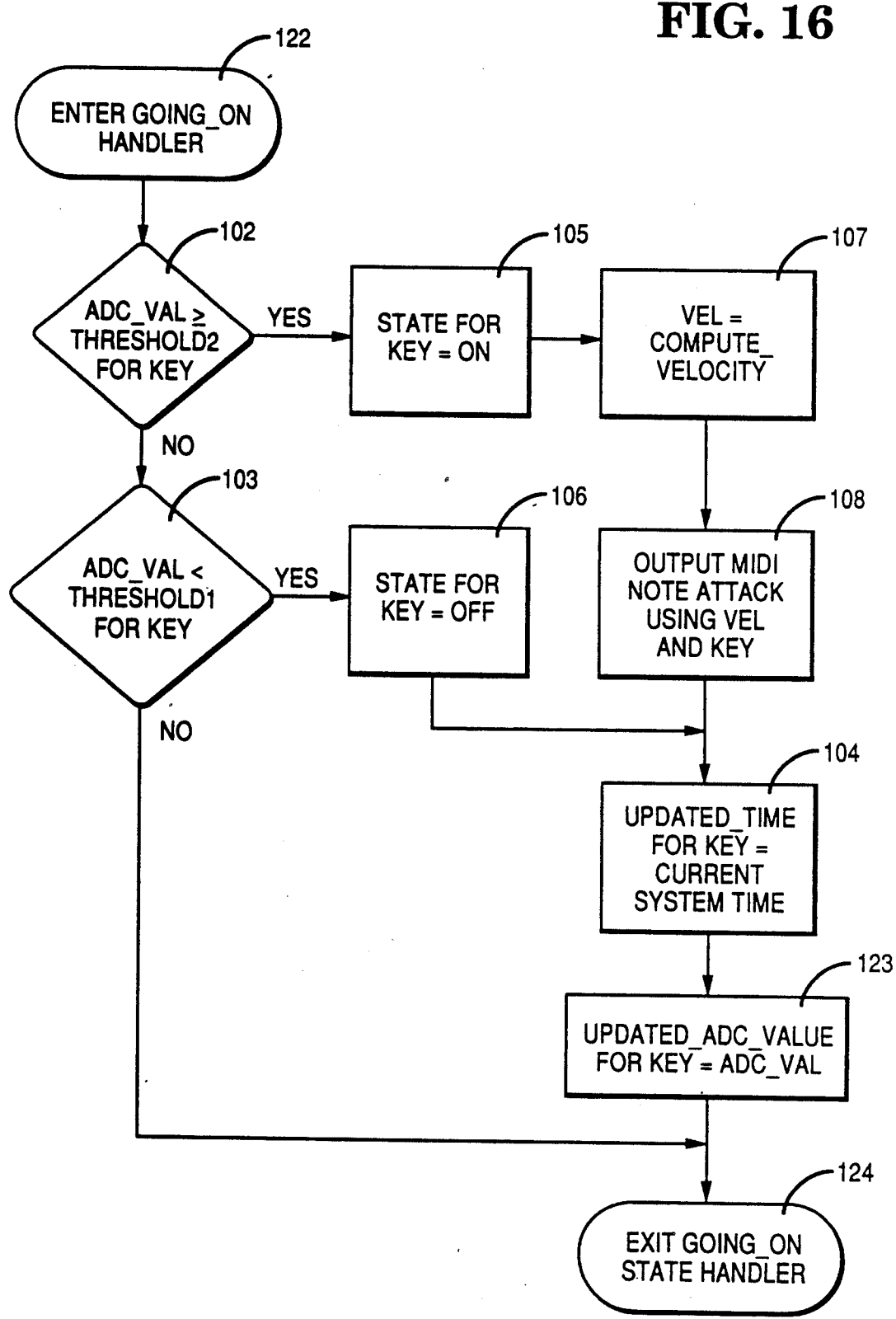
FIG. 16 is a flow chart of a GOING ON HANDLER sub-procedure according to one embodiment of the invention.
Figure 17A:
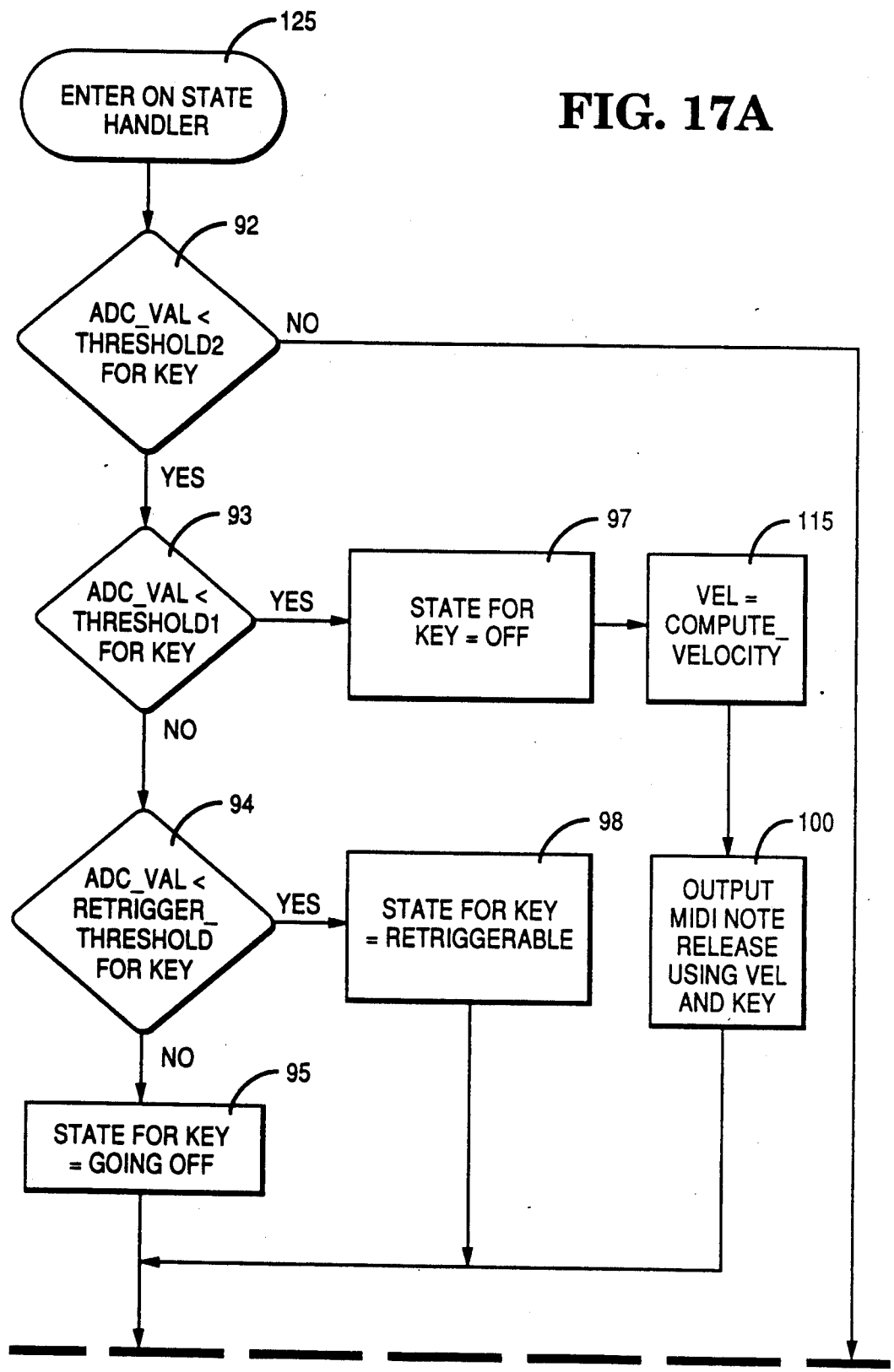
FIGS. 17A and 17B when joined together form a flow chart for an ON STATE HANDLER sub-procedure according to one embodiment of the invention.
Figure 17B:
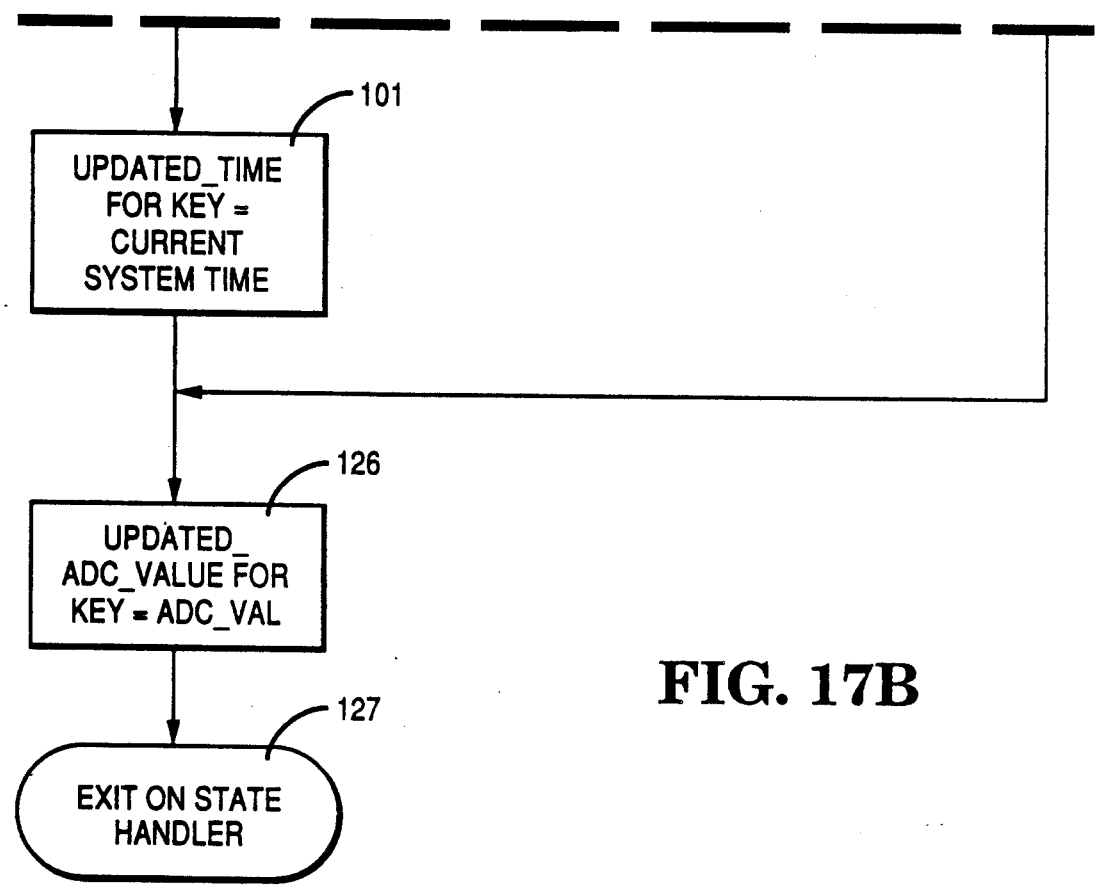
Figure 18A:
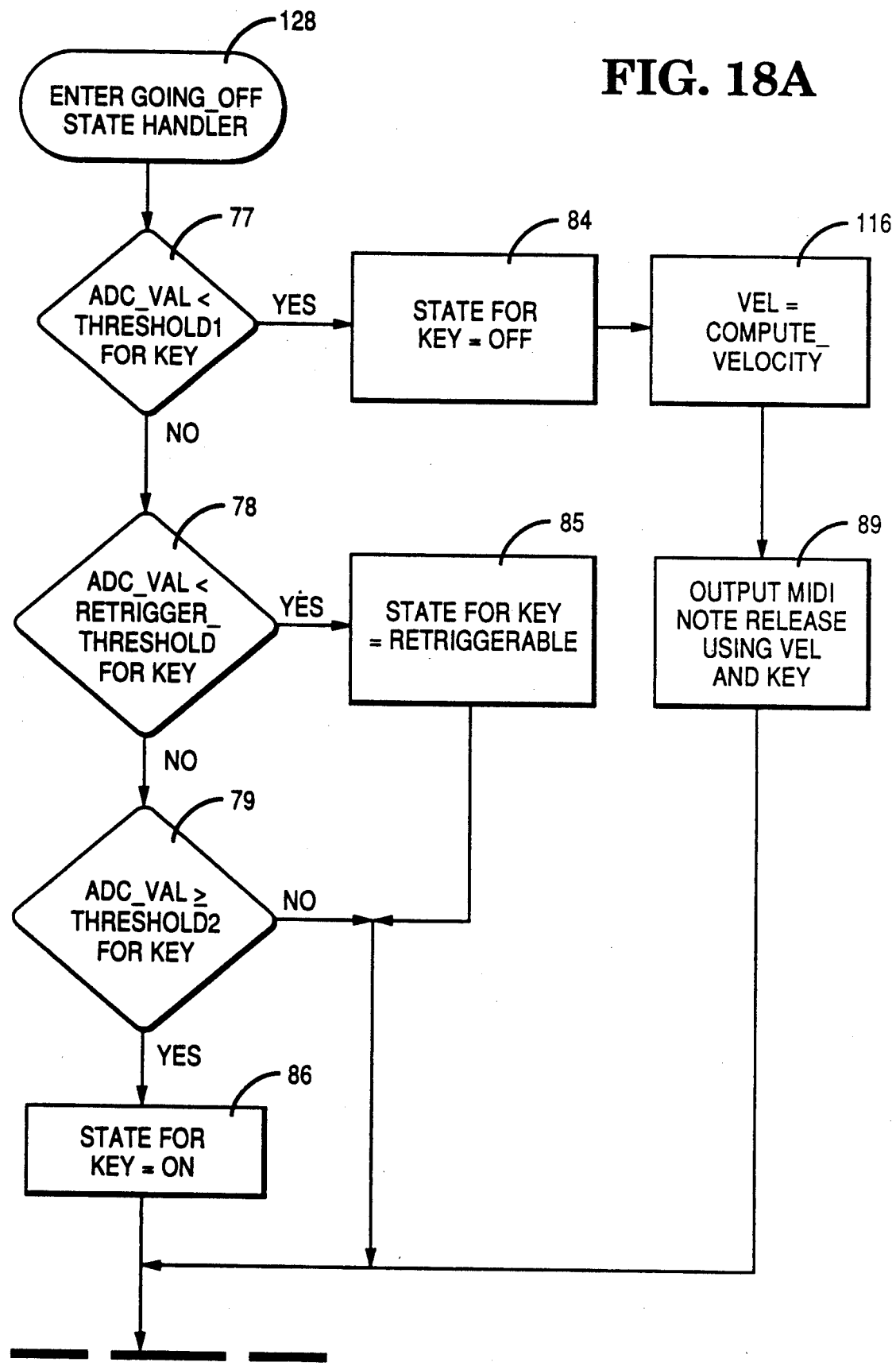
FIGS. 18A and 18B when joined together form a flow chart for a GOING OFF STATE HANDLER sub-procedure according to one embodiment of the invention.
Figure 18B:
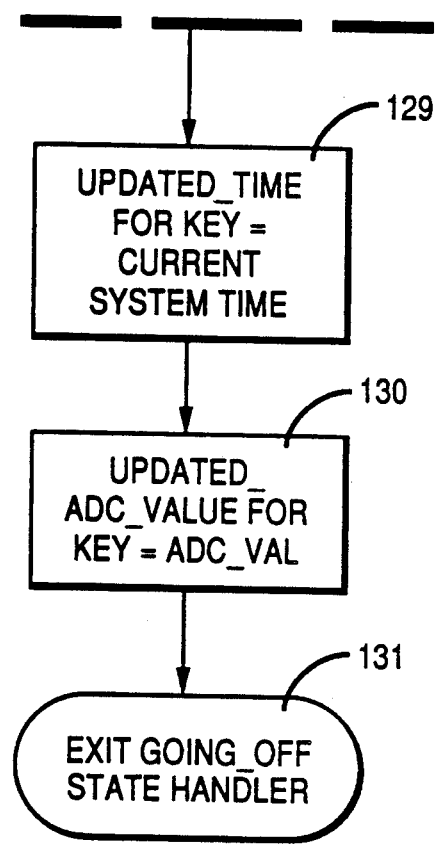
Figure 19A:
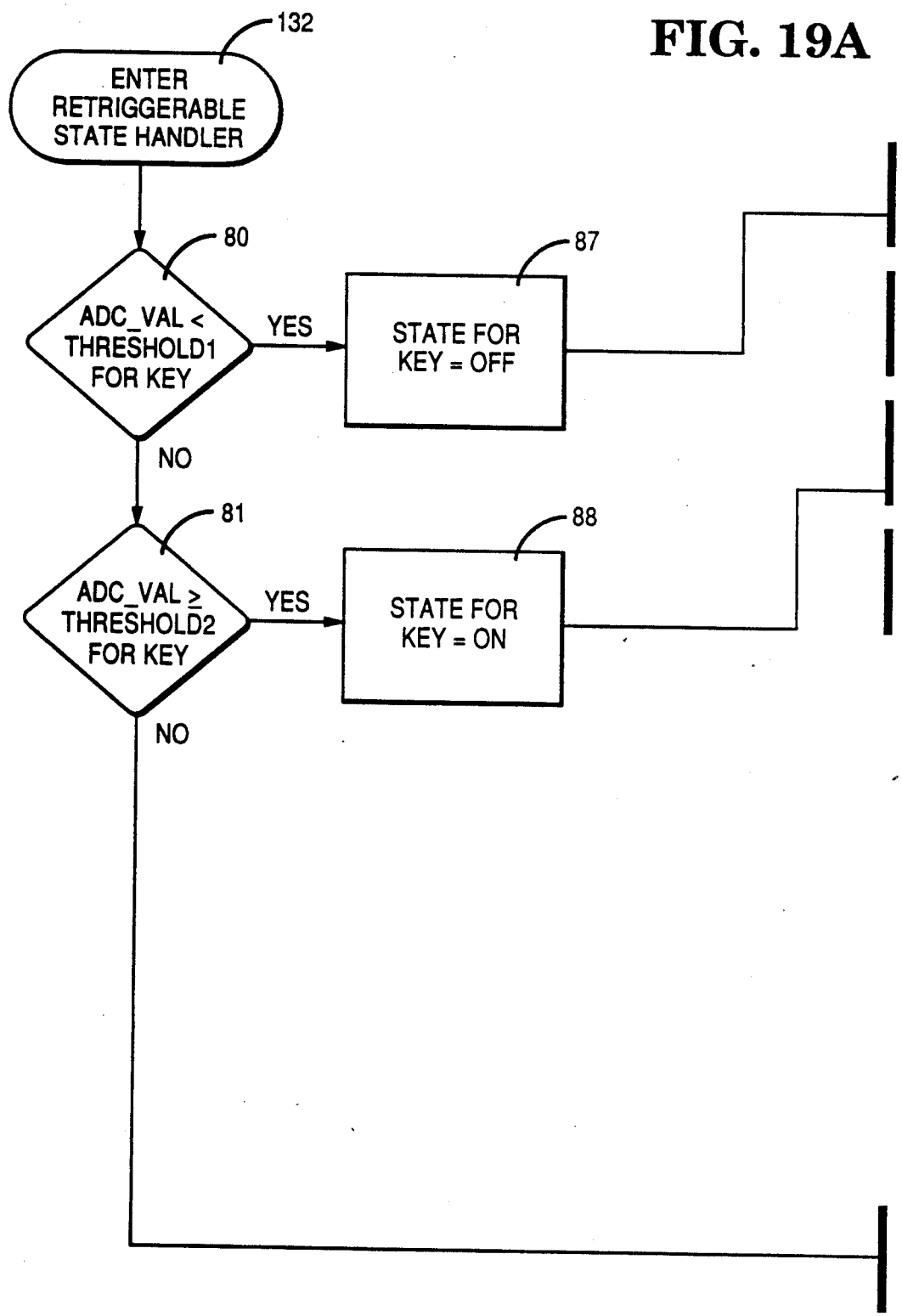
FIGS. 19A and 19B when joined together form a flow chart for a RETRIGGERABLE STATE HANDLER sub-procedure according to one embodiment of the invention.
Figure 19B:
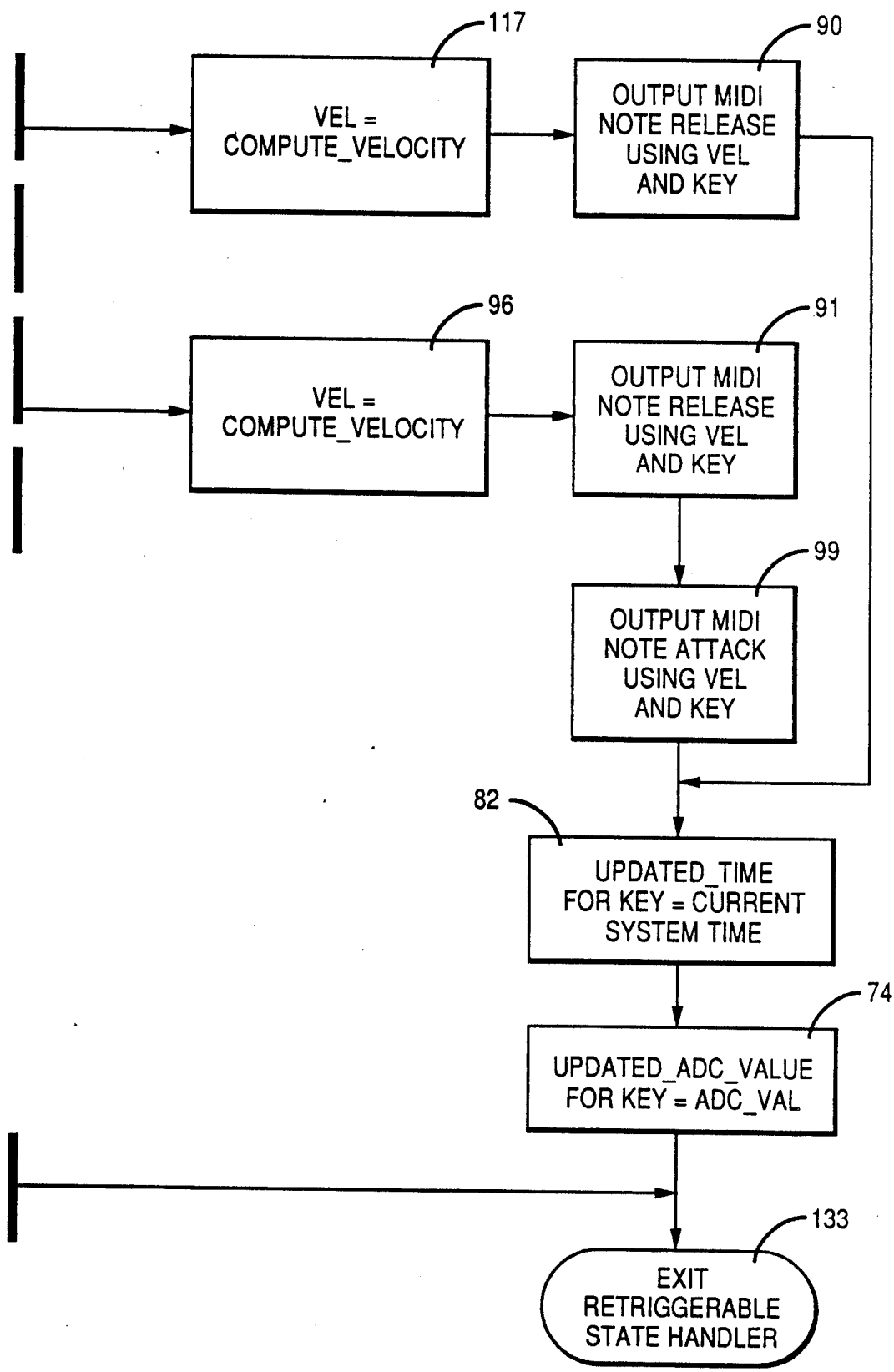

Referring now to FIGS. 14A and 14B, the Scan Procedure is initiated 66 by the program once the Init Procedure is completed. The first key 67 KEY=1 is enabled and sampled, and the ADC value of the key read by the microprocessor 30 and stored in central processing unit (CPU) memory 68. The state 69, 70, 71, 72 or 73 of the key is used to switch to one of five procedures. The five basic key states are off, going_on, on, going_off, and retriggerable (i.e. see General Givens, Appendix A). A key is in an "off" state if it is at rest or in region 1. A key state of "going_on" means that the key was previously "off", is currently in region 2, but not over threshold2 and into region 3. An "on" state means that the key has crossed threshold2, an event has been outputted, and the key is currently still in region 3. A key is "going-off" if the key was previously "on" and has been released into region 2B. Finally, a key is in a "retriggerable" state if it is in region 2A and was previously "going-off". When the key's state is determined via 69, 70, 71, 72, or 73, the appropriate handler function is called (134, 135, 136, 137, 138 respectively). The off handler 134 is represented by the flow chart in FIG. 15. The going_on handler 135 is represented by the flow chart in FIG. 16. The on handler 136 is represented by the flow chart in FIGS. 17A and 17B. The going_off handler 137 is represented by the flow chart in FIGS. 18A and 18B. The retriggerable handler 138 is represented by the flow chart in FIGS. 19A and 19B. Upon return from the handler function, the program increments to the next key 75 KEY=KEY+1. This value is compared 76 to the maximum number of keys plus one. If 75 KEY=KEY+1 is less than the value in 76, the current ADC value of the key 75 KEY=-KEY+1 is sampled 68 and the program then compares this current ADC value of the key to its previous state as before. This process is incremented until all of the keys are scanned and the Scan Procedure is exited 83. The Main Procedure again calls the Scan Procedure, which continues through all of the keys as before (i.e. the Scan Procedure is continuously called by the Main Procedure forever).

The five state handlers represented by the flow charts in FIGS. 15, 16, 17A, 17B, 18A, 18B, 19A and 19B will now be described in detail. If the state of the key is "off" 69 then the procedure for handling the off state is called 134. The off state handler is represented by the flow chart in FIG. 15 and is entered by a function call 120. The current ADC value of the key 68 is compared to 109 the threshold1 value for the key. If the ADC value 68 is greater than or equal to the threshold1 value, the program then compares 110 the current ADC value of the key 68 to the threshold2 value for the key. If the ADC value 68 is greater than or equal to the threshold2 value, the current key state is determined to be "on" 112, and an attack event is output 114 at maximum velocity 113 (i.e. key moved from region 1 to region 3 in a single scan . If, however, the current ADC value of the key 68 is greater than or equal to the threshold1 value but less than the threshold2 value, the state of the key is determined to be "going-on" 111, and the program then stores the current system time 118 and the current ADC value of the key 119 (i.e. the program simply updates the updated_time array and the updated_ADC_value array for the key as a reference in order to be able to process the next event and compute the velocity for the key when that particular key is again enabled and sampled). Finally, if the current ADC value of the key was less than the threshold1 value for the key, the key is still in region 1, is still considered to be in an "off" state, and the program then simply updates the updated_ADC_value of the key 119 and stores it in CPU memory for the next scan.

However, if the previous state of the key 67 KEY=1 was not "off" 69 but instead was "going_on" 70 (i.e. the position of the key was already in region 2), then the procedure for handling the going_on state is called 135. The going_on state handler is represented by the flow chart in FIG. 16 and is enterd by a function call 122. The current ADC value of the key 68 is first compared to 102 the threshold2 value for the key. If it 68 is greater than or equal to the threshold2 value, the current state of the key is determined to be "on" 105. The program then executes the compute_velocity subroutine 107 to obtain the velocity, outputs the MIDI note attack for the key 108 using the velocity measurement 107, and then updates the updated_time to the current system time 104 and the updated_ADC_value of the key 123. If in the comparison in 102 it is determined that the current ADC value of the key 68 was less than the threshold2 value, the program then compares the ADC value 68 to the threshold1 value for the key 103. If it 68 is less than the threshold1 value, the current state of the key is determined to be "off" 106 (i.e. the key moved from region 2 back to region 1 without triggering an event), and the program then updates the updated_time with the current system time 104 and the updated_AD-C_value of the key 123. If, however, the current ADC value of the key 68 was greater than or equal to the threshold1 value, the comparison 103 would determine that the current state of the key was still "going_on" (i.e. the key had remained in region 2 between the previous and current scans of the key), and the going_on handler would then simply exit 124 without updating the updated_time or updated_ADC_value for the key. If the previous state of the key 67 KEY=1 was not "going_on" 70, but instead was "on" 71 (i.e. the position of th key was in region 3), then the procedure for handling the on state is called 136. The on state handler is represented by the flow chart in FIGS. 17A and 17B and is entered by a function call 125. The current ADC value of the key 68 is first compared 92 to the threshold2 value for the key. If it 68 is less than the threshold2 value, the current ADC value of the key 68 is then compared 93 to the threshold1 value. If it 68 is less than the threshold1 value, the state of the key is determined to be "off" 97, the program then executes the compute_velocity subroutine 115 and outputs a MIDI note release for the key 100. The program then updates the updated_time with the current system time 101 and the updated_ADC_value 126 of the key. If the original comparison 92 with the threshold2 value determined that the current ADC value of the key 68 was greater than or equal to the threshold2 value, then the state of the key is still "on" ( i.e. the key has remained in region 3 between the previous and the current scans of the key), and the program then simply updates the updated_ADC_value of the key 126. If the comparison 93 determined that the current ADC value of the key 68 was, however, greater than or equal to the threshold1 value for the key, the program would then compare it 68 to the retrigger_threshold value 94. If the comparison 94 determined that the current ADC value of the key 68 was less than the retrigger_threshold value for the key, the current state of the key is determined to be "retriggerable" and the program then updates the updated_time with the current system time 101 and the updated_ADC_value 126 of the key. If, however, the current ADC value of the key 68 is greater than or equal to the retrigger_threshold, the program then determines that the state of the key is "going_off" 95 and updates the updated_time to the current system time 101 and the updated_ADC_value 126 of the key. The on state handler is then exited 127.

If the previous state of the key 67 KEY=1 was not "on" 71, but was instead "going_off" 72, then the procedure for handling the going_off state is called 137. The going_off state handler is represented by the flow chart in FIG. 18 and is entered by a function call 128. The current ADC value of the key 68 is first compared 77 to the threshold1 value for the key. If it 68 is less than the threshold1 value, the current state of the key is determined to be "off" 84 and the program then executes the compute_velocity subroutine 116 and outputs a MIDI note release for the key 89. The program then updates the updated_time to the current system time 129 and the updated_ADC_value 130 of the key. However, if in the above comparison the current ADC value of the key 68 is greater than or equal to the threshold1 value, it is then compared to the retrigger_threshold 78. If it is less than the retrigger_threshold, the state of the key is determined to be retriggerable and the program then updates the updated_time to the current system time 129 and the updated_ADC_value 130 of the key. If the current ADC value for the key 68 is greater than or equal to the retrigger_threshold, the program then compares it to the threshold2 value 79. If it is greater than or equal to the threshold2 value, the state of the key is determined to be "on" 86. However, since threshold1 has not been crossed or since the key has not been released into region 2A, an attack event is not output. The program then updates the updated_time to the current system time 129 and the updated_ADC_value 130 of the key. If the current ADC value of the key 68 is less than the threshold2 value, the key is still "going_off" and in region 2A. The program at this point then simply updates the updated_time to the current system time 129 and the updated_ADC_value 130 of the key.

Finally, if the previous state of the key 67 KEY=1 was not "going_off" 72 but "retriggerable" 73, then the procedure for handling the retriggerable state is called 138. The retriggerable state handler is represented by the flow chart in FIG. 19 and is entered by a function call 132. The current ADC value of the key 68 is first compared 80 to the threshold1 value for the key. If it is less than the threshold1 value, the state of the key is determined to be "off" 87 and the system executes the compute_velocity subroutine 117 and outputs a MIDI note release for the key 90. The program then updates the updated_time to the current system time 82 and the updated_ADC_value 74 of the key and exits at 133. If the ADC value of the key 68 is greater than or equal to the threshold1 value, the program then compares it to the threshold2 value for the key 81. If it is greater than or equal to the threshold2 value, the state of the key is determined to be "on" 88 and the system first executes the compute_velocity subroutine 96, then outputs a MIDI note release using the velocity measurement for the key 91, and then outputs a MIDI note attack 99 using the same velocity measurement for the key. The program then updates the updated_time to the current system time 82 and the updated_ADC_value 74 for the key and exits at 133. If the current ADC value of the key 68 is less than the threshold2 value, the key is still in region 2 and the retriggerable state handler then just exits 133.

The preferred methodology of the Scan Procedure describes an average velocity measurement of the key or movable element. The operation or methodology could, however, be easily changed to measure an average velocity over a shorter period of time, such that as the limit of delta time approached zero in the compute_velocity function, the measurement would approach an instantaneous velocity at the point where threshold2 is crossed. This could be accomplished easily by updating the updated_time and updated_ADC_value on every scan, effectively making the delta distance traveled in the compute_velocity function the distance traveled in one scan. This alternative methodology of measuring an instantaneous velocity is a more accurate representation of the striking force of the key or movable element because the key or movable element is accelerating. However, the disadvantage is that as the delta distance approaches zero, velocity resolution becomes poorer, particularly when the key or movable element is depressed slowly.

It should be noted that the compute_velocity function referenced in the flow charts of FIGS. 15, 16, 17A, 17B, 18A, 18B, 19A and 19B is simply a computation. It was not included in its entirety, first because it is only a mathematical formula. Secondly, since the details of the computation are somewhat long, it would have only made the flow charts more difficult to read and follow if the computation was replicated at every point in the flow charts where the compute_velocity function is utilized.

For the compute_velocity function, key velocity is calculated based upon the updated_time for the key, the updated_ADC_value of the key, the current ADC value of the key and the current system time. That is, key velocity is the difference between the updated_ADC_value and the current ADC value, divided by the total movement, which is the rest position minus the down position (in ADC values), then this delta distance is divided by the amount of time between the updated_time and the current scan. As previously explained, the advantage of this methodology is the achievement of a more accurate velocity resolution measurement and better consistency from key to key.

Thus, there has been disclosed a new opto-electronic sensing method and device for use in acoustic pianos. It is contemplated that other variations and modifications of the method and device will occur to those skilled in the art, and all such variations and modifications which fall within the spirit and scope of the appended claims are deemed to be part of the present invention.

APPENDIX A

Continuous Optoelectronic Scanning System Software Description

The following is a simplified explanation of the five aspects of the invention software:

GENERAL GIVEN (declarations, general functions, global variables)
ADJUSTMENT PROCEDURE (the opto rest/down position adjustment procedure)
INIT PROCEDURE (the scan initialization procedure)
SCAN PROCEDURE (the actual scan procedure)
MAIN PROCEDURE (the main procedure that uses the above procedures)

It is intended that this figure contain ANSI c code to be compiled with industry-standard c compilers, such as the Turbo c compiler from Borland International, Inc., 4585 Scotts Valley Drive, Scotts Valley, CA 95066. Anyone skilled in the art could reference this compiler manual or the industry-standard reference manaul: The C Programming Language, by Brian W. Kernighan and Dennis M. Ritchie, published by Prentice-Hall, Inc., Englewood Cliffs, NJ 07632 to understand and replicate the software for this invention.

```
/*

GENERAL GIVEN:

The following is a fragment of c code that applies globally to the
description of the invention.  The functions declared here
(get_adj_done(), get_adj_initiation(), get_adj_start(),
init_shift_register(), get_adc_value(), read_eeprom(),
write_eeprom(), get_sys_tick(), and output_midi_note()) are not
detailed in this figure.  It is assumed that anyone skilled in the
art can understand and replicate these easily.  Furthermore, these
functions may easily change depending on the actual implementation.

*/ define NUM_OF_KEYS 88
define FALSE 0
#define TRUE 1
#define MIN_SCAN_TIME 1
define MAX_SCAN_TIME 126 typedef byte unsigned char;

enum keystates {off, going_on, on, going_off, retriggerable,
                end_state};

int get_adj_done(void);      /* Function that returns TRUE if user
                                indicates that he is done with the
                                adjustment procedure */ int get_adj_initiation(void);  /* Function that returns TRUE if user
                                  indicates that he is wants to
                                  initiate the adjustment procedure */ int init_shift_register(void);  /* Any function required to initialize
                                   the hardware to start scanning the
                                   opto-interruptor adc values */ byte get_adc_value(int key);   /* Function that returns the adc value
                                  for the given key */ void read_eeprom(void);   /* Read the rest_position and down_position
                             values for each key from the nonvolatile
                             storage */
```

```c
void write_eeprom(void);    /* Write the rest_position and down_position
                               values for each key to the nonvolatile
                               storage */ unsigned int get_sys_tick(void);   /* Function that returns the current
                                      system time, a continuous-running
                                      clock. */ output_midi_note(int key, byte vel);   /* Output a MIDI key event to the
                                          MIDI output port. A vel of 0
                                          indicates release. */ byte rest_position[NUM_OF_KEYS], down_position[NUM_OF_KEYS];
byte total_travel[NUM_OF_KEYS], retrigger_threshold[NUM_OF_KEYS];
byte threshold1[NUM_OF_KEYS], threshold2[NUM_OF_KEYS];
int key, adj_done, offset;
byte adc_val, updated_adc_value[NUM_OF_KEYS];
unsigned int updated_time[NUM_OF_KEYS];
enum keystates state[NUM_OF_KEYS];

byte opto_vel_tbl[256] = {
    0x01,0x01,0x01,0x01,0x01,0x02,0x03,0x04,0x05,0x06,0x07,
    0x08,0x09,0x0A,0x0B,0x0D,0x0F,0x12,0x14,0x16,0x18,0x1A,0x1C,0x1E,
    0x20,0x22,0x24,0x26,0x28,0x2A,0x2B,0x2D,0x2F,0x30,0x32,0x34,0x35,
    0x37,0x38,0x3A,0x3B,0x3C,0x3E,0x3F,0x40,0x42,0x43,0x44,0x45,0x46,
    0x48,0x49,0x4A,0x4B,0x4C,0x4D,0x4E,0x4F,0x50,0x51,0x52,0x53,0x54,
    0x55,0x56,0x56,0x57,0x58,0x59,0x5A,0x5A,0x5B,0x5C,0x5D,0x5D,0x5E,
    0x5F,0x5F,0x60,0x61,0x61,0x62,0x63,0x63,0x64,0x64,0x65,0x65,0x66,
    0x66,0x67,0x67,0x68,0x68,0x69,0x69,0x6A,0x6A,0x6B,0x6B,0x6B,0x6C,
    0x6C,0x6D,0x6D,0x6D,0x6E,0x6E,0x6E,0x6F,0x6F,0x6F,0x70,0x70,0x70,
    0x71,0x71,0x71,0x72,0x72,0x72,0x72,0x73,0x73,0x73,0x73,0x74,0x74,
    0x74,0x74,0x75,0x75,0x75,0x75,0x75,0x76,0x76,0x76,0x76,0x76,0x77,
    0x77,0x77,0x77,0x77,0x77,0x78,0x78,0x78,0x78,0x78,0x78,0x79,0x79,
    0x79,0x79,0x79,0x79,0x79,0x79,0x7A,0x7A,0x7A,0x7A,0x7A,0x7A,0x7A,
    0x7A,0x7A,0x7B,0x7B,0x7B,0x7B,0x7B,0x7B,0x7B,0x7B,0x7B,0x7B,0x7B,
    0x7C,0x7C,0x7C,0x7C,0x7C,0x7C,0x7C,0x7C,0x7C,0x7C,0x7C,0x7C,0x7C,
    0x7C,0x7C,0x7D,0x7D,0x7D,0x7D,0x7D,0x7D,0x7D,0x7D,0x7D,0x7D,0x7D,
    0x7D,0x7D,0x7D,0x7D,0x7D,0x7D,0x7D,0x7D,0x7D,0x7D,0x7E,0x7E,0x7E,
    0x7E,0x7E,0x7E,0x7E,0x7E,0x7E,0x7E,0x7E,0x7E,0x7E,0x7E,0x7E,0x7E,
    0x7E,0x7E,0x7E,0x7E,0x7E,0x7E,0x7E,0x7E,0x7E,0x7E,0x7E,0x7E,0x7E,
    0x7E,0x7E,0x7E,0x7E,0x7E,0x7E,0x7E,0x7F,0x7F };

/* ADC position terminology:

----------- rest_position                          (rest)   (0)

region 1
                                                       Key      ADC
    ----------- threshold1                             pos      values region 2A
        region 2  ------------------- retrigger_threshold
                    region 2B ----------- threshold2 region 3

----------- down_position
                                                       (down)   (255)
                                                         V        V
*/
```

```
/*

ADJUSTMENT PROCEDURE:

The objective of the adjustment procedure is to establish the
rest_position and down_position for each key, then store these values
in non-volatile storage.  These variables are stored as individual
byte arrays, the length of which is equal to the number of keys
scanned (NUM_OF_KEYS).

*/ void adjustment_procedure() {
    for (key=0; key<NUM_OF_KEYS; key++) {
       rest_position[key] = 0xFF;
       down_position[key] = 0x00;
       }
    adj_done = FALSE;

while (!adj_done) {
       if (get_adj_done() == TRUE) adj_done = TRUE;
       else {
          init_shift_register();
          for (key=0; key<NUM_OF_KEYS; key++) {
             adc_val = get_adc_value(key);
             if (adc_val > down_position[key])
                down_position[key] = adc_val;
             else if (adc_val < rest_position[key])
                rest_position[key] = adc_val;
          }
       }
    }
    write_eeprom();
    }

/*

INIT PROCEDURE:

The objective of the init procedure is to read the rest_position and
down_position for each key from non-volatile storage, then calculate
the total_travel, threshold1, threshold2, and retrigger_threshold for
each key.  These variables are stored as individual byte arrays, the
length of which is equal to the number of keys scanned
(NUM_OF_KEYS).  In addition, the global variables position_adj and
retrigger_adj are user adjustable and are used to determine some of
the array variable values.  The position_adj variable serves to move
threshold1, threshold2, and retrigger_threshold equally up or down.
The retrigger_adj variable serves to control the "distance" between
threshold2 and the retrigger_threshold.  The units of the threshold
calculations have been simplified for the purposes of explanation.
Also, the mechanism from which the user can alter position_adj and
retrigger_adj is omitted for clarity.  Lastly, the init procedure
sets updated_adc_value to the rest_position, updated_time to the
current system time, and state to off.  These three variables are
also stored as individual arrays, the length of which is equal to the
number of keys scanned (NUM_OF_KEYS).

*/ void init_procedure() {
   read_eeprom();

for (key=0; key<NUM_OF_KEYS; key++) {
      total_travel[key] =
```

```
        down_position[key] - rest_position[key];
    threshold2[key] =
        down_position[key] - ((total_travel[key] / 3) * position_adj);
    threshold1[key] =
        threshold2[key] - (total_travel[key] / 3);
    retrigger_threshold[key] =
        threshold2[key] - retrigger_adj;
    if (retrigger_threshold[key] < threshold1[key])
        retrigger_threshold[key] = threshold1[key];

updated_adc_value[key] = rest_positon[key];
    updated_time[key] = get_sys_tick();
    state[key] = off;
    }
}
```

```
/*

SCAN PROCEDURE:

The objective of the scan procedure is to detect key movement across
previously initialized thresholds.  The scan procedure measures the
amount of time the key takes to travel the updated_adc_value and the
current adc value; however, threshold detection controls the flow of
the program.  When control flow indicates an event needs to be
transmitted, the scan procedure calculates the velocity based on the
updated_adc_value, updated_time, and current adc value for that key
plus the current system time, then transmits the event via the MIDI
port.  The velocity computation includes several multiplies that can
easily be converted to shifts and other changes can be made to
improve efficiency.  These have been omitted for clarity.  One could
also measure and output release velocity with minimal changes to this
code.

*/ byte compute_velocity(key,adc_val)
    int key;
    byte adc_val;
    {
    unsigned int time_temp, vel, delta_travel;

time_temp = get_sys_tick() - updated_time[key];
    if (time_temp > MAX_SCAN_TIME) time_temp = MAX_SCAN_TIME;
    else if (time_temp < MIN_SCAN_TIME) time_temp = MIN_SCAN_TIME;

delta_travel =
        (((adc_val - updated_adc_value[key]) * 256) / total_travel[key])* 256;
    if ((vel = delta_travel / time_temp) > 4095) vel = 4095;
    vel = vel << 4;

return(opto_vel_tbl[vel>>8]);
    } void scan_procedure() { init_shift_register();

for (key=0; key<NUM_OF_KEYS; key++) { switch (state[key]) {   /* Handle the key */ case off: /* Key was in region 1 last scan */
```

```
    /* We don't start timing until we reach threshold1 (region 1,
       going down).  This saves processing time on all keys at rest.
    adc_val = get_adc_value(key);
    if (adc_val >= threshold1[key]) {
       if (adc_val >= threshold2[key]) {
          state[key] = on;
          output_midi_note(key,compute_velocity(key,adc_val));
       }
       else state[key] = going_on;
       updated_time[key] = (unsigned int)get_sys_tick();
    }
    updated_adc_value[key] = adc_val;
    break;

case going_on:  /* Key was in region 2 last scan */ adc_val = get_adc_value(key);
    if (adc_val >= threshold2[key]) {
       state[key] = on;
       output_midi_note(key,compute_velocity(key,adc_val));
       updated_time[key] = (unsigned int)get_sys_tick();
       updated_adc_value[key] = adc_val;
    }
    else if (adc_val < threshold1[key]) {
       /* Key dropped back into region 1 without an attack */
       state[key] = off;
       updated_time[key] = (unsigned int)get_sys_tick();
       updated_adc_value[key] = adc_val;
    } break;

case on:  /* Key was in region 3 last scan */

/* Don't start timing until not in state on.  This saves
       processing time for all down keys.  */ adc_val = get_adc_value(key);
    if (adc_val < threshold2[key]) {
       if (adc_val < threshold1[key]) {

/* Key dropped from region 3 to region 1, release */
          state[key] = off;
          output_midi_note(key,0);
       }

/* Must be in region 2 */
       else {
          if (adc_val < retrigger_threshold[key])
             /* Must be in region 2A */
             state[key] = retriggerable;
          else    /* Must be in region 2B */
             state[key] = going_off;

}
       updated_time[key] = (unsigned int)get_sys_tick();
    } updated_adc_value[key] = adc_val;
    break;

case going_off:  /* Key was in region 2B last scan */ adc_val = get_adc_value(key);
    if (adc_val < threshold1[key]) {
       state[key] = off;
       output_midi_note(key,0);
    }
```

```
            else if (adc_val < retrigger_threshold[key])
               /* Moved into region 2A */
               state[key] = retriggerable;

else if (adc_val >= threshold2[key])
               state[key] = on;  /* On, but do not retrigger. */ updated_time[key] = (unsigned int)get_sys_tick();
            updated_adc_value[key] = adc_val;
            break;

case retriggerable:  /* Key was in region 2A last scan */ adc_val = get_adc_value(key);
            if (adc_val < threshold1[key]) {
               state[key] = off;
               output_midi_note(key,0);

updated_time[key] = (unsigned int)get_sys_tick();
               updated_adc_value[key] = adc_val;
            } else if (adc_val >= threshold2[key]) {

/* Moved back into region 3, so retrigger */
               state[key] = on;

/* First, release the present note. */
               output_midi_note(key,0);

/* Now, for the retrigger. */
               output_midi_note(key,compute_velocity(key,adc_val));

updated_time[key] = (unsigned int)get_sys_tick();
               updated_adc_value[key] = adc_val;
            } break;
      }
   }
}
/*

MAIN PROCEDURE:

The objective of the main procedure is to call the init procedure, then
loop forever between the scan procedure and testing to see if the user
wants to initiate the adjustment procedure.  Background procedures may deal
with interrupt-level communication, maintainance of the system timer,
etc.

*/ main() {
   init_procedure();

/* A loop that continues forever */
   while (TRUE) {

/* If user wants to adjust, do it */
      if (get_adj_initiate()) {
         adjustment_procedure();
         init_procedure();
      } scan_procedure();   /* Main work is done here */
   }
}
```

What is claimed as new and desired to be secured by Letters Patent of the United States is:

1. A motion sensing device for use with a keyboard manual having a plurality of keys, comprising:
   a base having a slot therein;
   means for emitting electromagnetic radiation afixed to said base at a first side of the slot;
   means for transducing electromagnetic radiation into an electric signal afixed to said base at a second side of the slot opposite to said electromagnetic radiating emitting means;
   a lever hingeably attached to said base at a first end;
   said lever having an arcuate top surface for maintaining tangential contact with a respective key of said plurality of keys as said key is depressed;
   a flag attached to said lever and aligned with the slot of said base; and
   an elastic member biasing said lever in an up position against the force of gravity on said lever and said flag.

2. A motion sensing device according to claim 1, wherein said lever has a second end, and a distance from said hinge to said second end is greater than a distance from said hinge to said flag thereby reducing the vertical distance that said flag must travel as said second end of said lever is depressed by a key.

3. A motion sensing device according to claim 2, wherein said lever has an arcuate top surface for maintaining tangential contact with said key as said key is depressed.

4. A motion sensing device according to claim 1, wherein said arcuate top surface is circular, and of a radius which provides minimal sliding in the longitudinal direction of said key.

5. A motion sensing device according to claim 3, wherein said arcuate top surface is circular, and of a radius which provides minimal sliding in the longitudinal direction of said key.

6. A motion sensing apparatus, comprising:
   a base having a slot therein;
   means for emitting electromagnetic radiation afixed to said base at a first side of the slot;
   means for transducing electromagnetic radiation into an electric signal afixed to said base at a second side of the slot opposite to said electromagnetic radiating emitting means and irradiated thereby;
   a lever hingeably attached to said base at a first end;
   an elastic member biasing said lever in an up position against the force of gravity on said lever; and
   flag means attached to said lever and aligned with the slot of said base for penetrating into the slot as said lever is lowered from said up position and effecting said electric signal by changing the amount of electromagnetic radiation irradiating said transducing means.

7. A motion sensing apparatus according to claim 6, wherein said electrical signal is effected in a manner directly proportional to the distance that said lever is lowered.

8. A motion sensing apparatus according to claim 6, wherein said lever has a hole in a second end opposite said first end into which a link member is inserted for imparting a downward force on said lever.

9. A motion sensing apparatus according to claim 6, wherein said lever has an arcuate top surface for maintaining tangential contact with a key as said key is depressed and lowers said lever from said up position.

10. A motion sensing apparatus according to claim 7, wherein said lever has an arcuate top surface for maintaining tangential contact with a key as said key is depressed and lowers said lever from said up position.

11. A motion sensing apparatus according to claim 9, wherein said arcuate top surface is circular, and of a radius which provides minimal sliding in the longitudinal direction of said key.

12. A motion sensing apparatus according to claim 10, where said arcuate top surface is circular, and of a radius which provides minimal sliding in the longitudinal direction of said key.

13. A motion sensing device for use with a pedal manual of a musical instrument having a pedal, comprising:
   a base having a slot therein;
   means for emitting electromagnetic radiation afixed to said base at a first side of the slot;
   means for transducing electromagnetic radiation into an electric signal afixed to said base at a second side of the slot opposite to said electromagnetic radiating emitting means;
   a lever hingeably attached to said base at a first end;
   said lever having a second end opposite said first end which is connected to said pedal for imparting a downward force to said second end;
   a flag attached to said lever and aligned with the slot of said base; and
   an elastic member biasing said lever in an up position against the force of gravity on said lever and said flag.

* * * * *